(12) United States Patent
Oota et al.

(10) Patent No.: US 7,832,318 B2
(45) Date of Patent: Nov. 16, 2010

(54) PAPER SHEET PROCESSING DEVICE

(75) Inventors: Ryuichi Oota, Kinokawa (JP); Hideki Oiwa, Kinokawa (JP); Akira Wada, Kinokawa (JP)

(73) Assignee: Duplo Seiko Corporation, Kinokawa-Shi, Wakayama (JP)

( * ) Notice: Subject to any disclaimer, the term of this patent is extended or adjusted under 35 U.S.C. 154(b) by 81 days.

(21) Appl. No.: 12/130,403

(22) Filed: May 30, 2008

(65) Prior Publication Data

US 2008/0258379 A1 Oct. 23, 2008

Related U.S. Application Data

(62) Division of application No. 10/563,424, filed as application No. PCT/JP2005/002805 on Feb. 22, 2005, now Pat. No. 7,419,149.

(30) Foreign Application Priority Data

| Feb. 24, 2004 | (JP) | ............................ 2004-048302 |
| Feb. 24, 2004 | (JP) | ............................ 2004-048303 |
| Feb. 24, 2004 | (JP) | ............................ 2004-048304 |
| Apr. 28, 2004 | (JP) | ............................ 2004-133690 |

(51) Int. Cl.
*B65H 35/00* (2006.01)

(52) U.S. Cl. .......................................... 83/404; 83/371

(58) Field of Classification Search .................... 83/404, 83/405, 406, 408, 481, 371, 404.4, 425.2
See application file for complete search history.

(56) References Cited

U.S. PATENT DOCUMENTS

| 3,866,497 | A | * | 2/1975 | Wolfberg et al. .............. 83/346 |
| 5,746,162 | A | | 5/1998 | Hosoi et al. |
| 6,012,366 | A | | 1/2000 | Shimizu |
| 6,131,723 | A | | 10/2000 | Schroader et al. |
| 6,332,388 | B1 | * | 12/2001 | Kishine et al. ................ 83/371 |
| 2003/0035143 | A1 | | 2/2003 | Glemser et al. |
| 2003/0036468 | A1 | | 2/2003 | Blank et al. |
| 2003/0215275 | A1 | | 11/2003 | Tamura et al. |

FOREIGN PATENT DOCUMENTS

| EP | 0999019 | * | 5/2000 |
| JP | 53-36636 | | 10/1978 |
| JP | 61-99168 | | 6/1986 |

(Continued)

OTHER PUBLICATIONS

Office Action in RU 2006100295 dated Feb. 27, 2009, and an English Translation thereof.

(Continued)

*Primary Examiner*—Stephen Choi
(74) *Attorney, Agent, or Firm*—Buchanan Ingersoll & Rooney PC

(57) ABSTRACT

A paper sheet processing device for processing paper sheets while carrying the paper sheets, includes a device body, a carrier for carrying the paper sheets one by one, a carrier driver for driving the carrier, processing device parts which are installed in a carrying route and which process the paper sheets, and a processing driver for driving the processing device parts. The processing device parts are installed detachably from the device body.

13 Claims, 32 Drawing Sheets

FOREIGN PATENT DOCUMENTS

| | | | |
|---|---|---|---|
| JP | 8-290392 | A | 11/1996 |
| JP | 09-151025 | | 6/1997 |
| JP | 10-076495 | A | 3/1998 |
| JP | 10-146796 | A | 6/1998 |
| JP | 2000-034052 | A | 2/2000 |
| JP | 2001-071293 | | 3/2001 |
| JP | 2001-105383 | A | 4/2001 |
| JP | 2001-232700 | A | 8/2001 |
| JP | 2001-261216 | | 9/2001 |
| JP | 2001-335166 | A | 12/2001 |
| JP | 2003-175492 | | 6/2003 |
| JP | 2003-182927 | | 7/2003 |
| JP | 2003-212425 | | 7/2003 |
| JP | 2005-239312 | | 9/2005 |
| RU | 2122937 | | 12/1998 |
| WO | WO 95/05927 | | 3/1995 |

OTHER PUBLICATIONS

Office Actions in JP 2004-048302 and JP 2004-048303 dated Jul. 22, 2008.

English translation of Office Action issued Jul. 22, 2008 in JP 2004-048302, the Office Action was submitted on Sep. 24, 2008.

English translation of Office Action issued Jul. 22, 2008 in JP 2004-048303, the Office Action was submitted on Sep. 24, 2008.

* cited by examiner

PAPER SHEET PROCESSING DEVICE

TECHNICAL FIELD

The present invention relates to a paper sheet processing device for processing paper sheets while carrying the paper sheets.

BACKGROUND ART

Patent literature 1 discloses a paper sheet processing device for processing paper sheets while carrying the paper sheets. In this paper sheet processing device, a paper feeding device part carries the paper sheets one by one to feed them to a device body; and the device body cuts or folds the paper sheets in the carrying direction or the direction perpendicular to the carrying direction while carrying the paper sheets. In addition, Patent literature 1 discloses a technology wherein a cutting means or a fold forming means is moved to control its position.

Patent literature 2 discloses a cutting device for cutting paper sheets to obtain cards having predetermined dimensions. In addition, Patent literature 2 also discloses a technology wherein a cutting device part is formed of a detachable unit, a plurality of the units are installed, and the cutting round blades of the respective units are arranged so as to respectively correspond to the various dimensions of the cards.

Patent literatures 2 and 3 disclose devices for performing cutting and shearing.

Patent literatures 4 and 5 disclose devices provided with a cutting means for cutting paper sheets and a cutting waste elimination means for eliminating cutting waste generated by cutting to the outside of a carrying route.

Patent literature 6 discloses a technology wherein paper sheets are adsorbed and carried one by one in a paper feeding device part.

Patent literature 7 discloses a technology wherein paper sheets are fed in a state of being inclined with respect to the carrying direction by inclining the rotation shaft of a paper sheet feeding roller in a paper feeding device part with respect to the carrying direction.

Patent literature 1: Japanese Published Patent Application No. 2001-232700
Patent literature 2: Japanese Published Patent Application No. H10-76495
Patent literature 3: Japanese Published Patent Application No. H08-290392
Patent literature 4: Japanese Examined Patent Application Publication No. S53-36636
Patent literature 5: Japanese Published Patent Application No. H10-146796
Patent literature 6: Japanese Published Patent Application No. 2000-34052
Patent literature 7: Japanese Published Patent Application No. 2001-335166

DISCLOSURE OF THE INVENTION

Problems to be Solved by the Invention

In a paper sheet processing device, because of abrasion or wearout of processing means, it is occasionally necessary to replace the processing means. In such cases, in the device of Patent literature 1, it was necessary to disassemble some parts of the device and to replace them. Hence, there was a problem of requiring time and effort for replacement work and being unable to use the device during the replacement work.

In addition, in the paper sheet processing device disclosed in Patent literature 1, if various kinds of processing means are installed to provide various kinds of processing functions, the device is upsized. On the other hand, in actual circumstances, some of the various kinds of processing means are used less frequently.

Furthermore, in the device of Patent literature 2, a unit having a cutting round blade and secured at a predetermined position cuts paper sheets at a predetermined position; however, another unit is necessary to perform cutting at a different position; hence, numerous units are required to be prepared according to cutting dimensions.

On the other hand, the cutting waste elimination means in the conventional paper sheet processing device is secured at a predetermined position in the direction (the width direction of paper sheets) perpendicular to the carrying direction. Hence, if the cutting position is changed, the generation position of cutting waste is also changed, whereby problems described below are caused.

(1) Paper sheets are ejected to a paper ejection part without eliminating cutting waste; hence, it is necessary to eliminate the cutting waste at the paper ejection part.

(2) For the purpose of eliminating cutting waste, the position of the cutting waste elimination means is required to he changed manually each time the generation position of cutting waste is changed.

Still further, in the paper sheet processing device of Patent literature 1, the processing for cutting paper sheets in the carrying direction is performed while one fringe of the paper sheet is used as a reference, for example. Hence, in the paper sheet processing devices of Patent literatures 1 and 6, paper feeding is performed such that the fringe of the paper sheet is aligned along a guide.

However, in this kind of paper sheet processing device, no problem occurs in the case that the printed area (the area wherein printing was performed) of the paper sheet is at a normal position, but in the case of an abnormal position, a problem occurs. In other words, in FIG. 37, as shown in (a), in the case that the printed area 101 of a paper sheet 100 is inclined with respect to the fringe 111 of the paper sheet 100, the cutting in the carrying direction with reference to the fringe 111 is performed so as to be inclined with respect to the printed area 101 as indicated by the alternate long and short dash lines of (b); furthermore, the cutting in the direction perpendicular to the carrying direction with reference to the fringe 112 is also performed so as to be inclined with respect to the printed area 101 as indicated by the alternate long and short dash lines of (c); as a result, as shown in (d), a paper sheet 100 having the printed area 101 kept inclined with respect to the fringes 111 and 112 is obtained.

The technology of Patent literature 7 is intended to solve the problem shown in FIG. 37; however, a plate for controlling the fringes of paper sheets is provided in a paper feeding device part, and it is conceivable that this plate interferes with the feeding of paper sheets being inclined, whereby it is conceivable that carrying capable of solving the problem described above cannot be performed stably.

A first object of the present invention is to provide a paper sheet processing device capable of reducing time and effort required for replacement work for processing means.

A second object of the present invention is to provide a paper sheet processing device which is capable of moving the position of the processing means and is capable of being applicable to multiple cutting dimensions by using one unit. Furthermore, the object is to provide a paper sheet processing device capable of performing proper processing even in the case that the printed position of a paper sheet is misaligned.

A third object of the present invention is to provide a paper sheet processing device being not upsized while having various kinds of processing functions.

A fourth object of the present invention is to provide a paper sheet processing device capable of securely eliminating cutting waste from the carrying route without manually changing the position of the cutting waste elimination means even if the generation position of cutting waste is changed.

A fifth object of the present invention is to provide a paper sheet processing device capable of processing a paper sheet having a printed area inclined with respect to the fringe thereof and obtaining a paper sheet having the printed area being in parallel with the fringe.

Means for Solving the Problems

The present invention is a paper sheet processing device for processing paper sheets while carrying the paper sheets. This device comprises a device body, carrier means for carrying the paper sheets one by one, carrier driving means for driving the carrier means, processing device parts which are installed in a carrying route formed of the carrier means and which process the paper sheets, and processing driving means for driving the processing device parts. In this device, the processing device parts are installed detachably from the device body.

In addition, the present invention is preferably provided with the following configurations.

(1) The processing device part is a first type processing device part for performing processing having a predetermined content to the paper sheets. The first type processing device part has processing means for performing processing having the predetermined content to the paper sheets and moving means for moving the processing means to a desired position.

(2) The processing device part is a second type processing device part for performing processing having a content selected as desired. The second type processing device part has processing means for performing the processing having the content selected as desired. The device body is provided with processing type detecting means for detecting the type of the processing means of the second type processing device part.

(3) In the configuration (2), the second type processing device part has moving means for moving the processing means to a desired position.

(4) In the configuration (1), the processing means of the first type processing device part is cutting means for cutting the paper sheets in the carrying direction of the paper sheets, or perforation forming means for forming perforations in the paper sheets in the carrying direction of the paper sheets, or fold forming means for forming folds on the paper sheets in the carrying direction of the paper sheets.

(5) In the configuration (2), the processing means of the second type processing device part is cutting means for cutting the paper sheets in the carrying direction of the paper sheets, or perforation forming means for forming perforations in the paper sheets in the carrying direction of the paper sheets, or fold forming means for forming folds on the paper sheets in the carrying direction of the paper sheets.

(6) In the configuration (2), the processing means of the second type processing device part is cutting means for cutting the paper sheets in the direction perpendicular to the carrying direction of the paper sheets, or fold forming means for forming folds on the paper sheets in the direction perpendicular to the carrying direction of the paper sheets, or carrier means for carrying the paper sheets.

(7) In the configuration (5), the cutting means is configured such that multiple rotary blades are arranged at predetermined intervals in the width direction.

(8) In the configuration (7), the cutting means comprising the multiple rotary blades can be moved integrally.

(9) The configuration (1) or (3) further comprises position control means for reading position marks printed on the paper sheets and for controlling the position of the processing means on the basis of the information having been read.

(10) The configuration (1) or (2) further comprises processing control means for reading processing information printed on the paper sheets and for controlling the processing content of the processing means on the basis of the information having been read.

(11) The processing device part is cutting means for cutting the paper sheets in the carrying direction. And the present invention further comprises cutting waste elimination means for eliminating paper sheet cutting waste generated by cutting by the cutting means to the outside of the carrying route, moving means for moving the cutting waste elimination means in the direction perpendicular to the carrying direction, and movement control means for controlling the cutting waste elimination means to cutting waste generation positions.

(12) In the configuration (11), the movement control means judges that paper sheet pieces having a predetermined width dimension obtained after cutting are cutting waste and controls the moving means, on the basis of processing information.

(13) In the configuration (12), the processing information has been input beforehand.

(14) In the configuration (12), the processing information has been printed beforehand on the paper sheets to be processed and is read.

(15) In the configuration (12), the predetermined width dimension is 5 mm or more and 15 mm or less.

(16) In the configuration (11), the movement control means reads position marks printed on the paper sheets and controls the position of the cutting waste elimination means on the basis of the information having been read.

(17) The present invention further comprises a paper feeding device part for carrying and feeding the paper sheets one by one to the device body. The paper feeding device part comprises feeding means for feeding the paper sheets one by one, and oblique carrier means, which is positioned on the downstream side of the feeding means and on which the paper sheet is placed, for obliquely carrying the paper sheet toward a guide wall so that the fringe of the paper sheet is aligned along a guide wall and for carrying the paper sheet to the downstream side of the carrying direction. And the paper feeding device part is rotatable around a vertical shaft with respect to the device body so that the carrying direction in the paper feeding device part is inclined with respect to the carrying direction in the device body.

EFFECT OF THE INVENTION

According to the present invention, since the processing device parts are installed detachably from the device body, time and effort required for replacement work for the components of the processing device parts can be reduced.

According to the configuration (1) described above, time and effort required for replacement work for the processing means can be reduced. In addition, since the first type processing device part has the moving means for moving the processing means to a desired position, proper processing can be performed even in the case that the printed position of the paper sheet is misaligned.

According to the configuration (2) described above, since the second type processing device part is installed detachably from the device body and has the processing means for performing processing having a content selected as desired, the second type processing device part can use the processing means corresponding to the content selected as desired; hence, the cutting functions of the paper sheet processing device can be expanded.

In addition, since the space for only one processing device part is required for installing one second type processing device part although the second type processing device part can fulfill various kinds of processing functions, the upsizing of the device can be suppressed.

According to the configuration (3) described above, the processing means can be moved in the second type processing device part. Hence, even in the case that the printed position of the paper sheet is misaligned, the processing means can be moved to a proper position and can perform proper processing.

According to the configuration (4) described above, even in the case that processing means required to be replaced is the cutting means, the perforation forming means or the fold forming means, time and effort for replacement work for the processing means can be reduced.

According to the configuration (5), the cutting means for cutting the paper sheets in the carrying direction of the paper sheets, or the perforation forming means for forming perforations in the paper sheets in the carrying direction of the paper sheets, or the fold forming means for forming folds on the paper sheets in the carrying direction of the paper sheets can be used in the second type processing device part.

According to the configuration (6), the cutting means for cutting the paper sheets in the direction perpendicular to the carrying direction of the paper sheets, or the fold forming means for forming folds on the paper sheets in the direction perpendicular to the carrying direction of the paper sheets can be used in the second type processing device part.

According to the configuration (7) described above, the cutting means comprising multiple rotary blades can be used in the second type processing device part.

According to the configuration (8) described above, the cutting means comprising multiple rotary blades can be moved in the second type processing device part.

According to the configuration (9) described above, the device itself can automatically perform the movement control of the position of the processing means.

According to the configuration (10) described above, the device itself can automatically perform control for the processing content of the processing means.

According to the configuration (11) described above, since the cutting waste elimination means is moved automatically to the generation position of cutting waste, the following effects can be produced.

(i) The trouble of manually changing the position of the cutting waste elimination means can be lost, and the efficiency of paper sheet processing can be improved.

(ii) Cutting waste can be eliminated securely from the carrying route.

According to the configuration (12) described above, the paper sheet pieces having the predetermined width dimension can be eliminated securely from the carrying route.

According to the configuration (13) described above, the paper sheet pieces having the predetermined width dimension can be eliminated securely from the carrying route on the basis of the processing information having been input beforehand.

According to the configuration (14) described above, the paper sheet pieces having the predetermined width dimension can be eliminated securely from the carrying route on the basis of the processing information having been printed beforehand on the paper sheets.

According to the configuration (15) described above, the paper sheet pieces having a width dimension of 5 mm or more and 15 mm or less can be eliminated securely from the carrying route.

According to the configuration (16) described above, the cutting waste elimination means can be moved to an accurate position even in the case that the printed position of the paper sheet is misaligned.

According to the configuration (17) described above, the carrying direction in the paper feeding device part can be inclined with respect to the carrying direction in the device body by rotating the paper feeding device part around the vertical shaft. Hence, when processing a paper sheet having a printed area inclined by angle α with respect to the fringe thereof, the carrying direction in the paper feeding device part is inclined by angle α with respect to the carrying direction in the device body so that the printed area is made parallel with the carrying direction in the device body, whereby the cutting or the like in the direction in parallel with the printed area can be performed. Hence, by processing a paper sheet having a printed area inclined with respect to the fringe thereof, it is possible to obtain a paper sheet having the printed area being in parallel with the fringe.

DESCRIPTION OF NUMERALS

Figure 1:
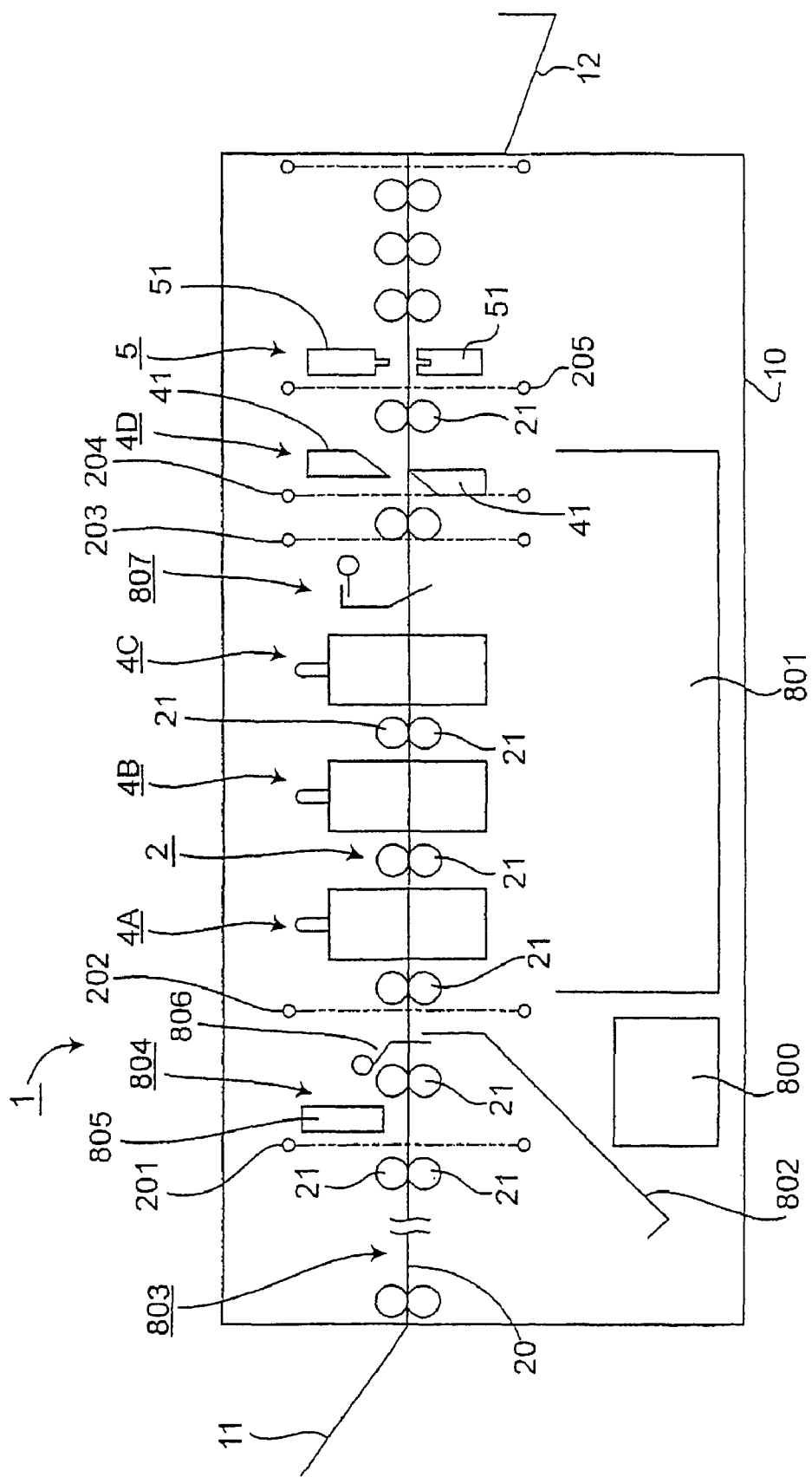
FIG. 1 is a schematic vertical sectional view showing the whole of a paper sheet processing device in accordance with a first embodiment of the present invention.

1: Paper sheet processing device
10: Device body
100: Paper sheet
102: Position mark
103: Bar code
111: Fringe
15: Paper feeding device part
2: Carrier means
20: Carrying route
3: Cutting waste elimination device part
31,32: Cutting waste elimination means
4A: First cutting device part
4B: Second cutting device part
4C: Third cutting device part
4D: Fourth cutting device part
40: Oblique carrier means
404: Guide wall
5: Fold forming device part
50: Adsorption carrier means
55,56: Rotation shaft
7: Optional processing device part
70A: Perforation forming unit
70B: Cutting unit
70C: Business-card-only unit
70D: Carrying unit
70X: Cutting unit
71: Perforation forming tool
72,74: Cutting cutter
73: Business card cutting tool
716,717: Light-shielding plate
9: Unit accommodating part
981,982: Optical sensor

BEST MODES FOR CARRYING OUT THE INVENTION

First Embodiment

FIG. 1 is a schematic vertical sectional view showing the whole of a paper sheet processing device in accordance with a first embodiment of the present invention. A paper sheet processing device 1 is provided with a paper feeding part 11 comprised of a paper feeding tray and a paper ejection part 12 comprised of a paper ejection tray on both ends of the device body 10 thereof. A carrying route 20 is formed of carrier means 2 comprising multiple pairs of rollers 21 in the range from the paper feeding part 11 to the paper ejection part 12. Carrier driving means (not shown) are connected to the carrier means 2. In addition, a carrying correction means 803, an information reading means 804, a rejection means 806, a first cutting device part 4A, a second cutting device part 4B, a third cutting device part 4C, a cutting waste dropping means 807, a fourth cutting device part 4D and a fold forming device part 5 are installed on the carrying route 20 from the side of the paper feeding part 11. These are all supported on the device body 10. Furthermore, processing driving means (not shown) are connected to these means. The first cutting device part 4A, the second cutting device part 4B, the third cutting device part 4C, the fourth cutting device part 4D and the fold forming device part 5 correspond to the first type processing device part.

Besides, the paper sheet processing device 1 is provided with a control means 800 for controlling the operation of the whole device inside the device body 10. The control means 800 has a CPU connected to an operation panel (not shown). The control means 800 also performs control, for example, as a position control means and a processing control means, these being described later. Moreover, the paper sheet processing device 1 has a trash box 801 for accommodating cutting waste generated by cutting paper sheets at the bottom part inside the device body 10.

Figure 2:
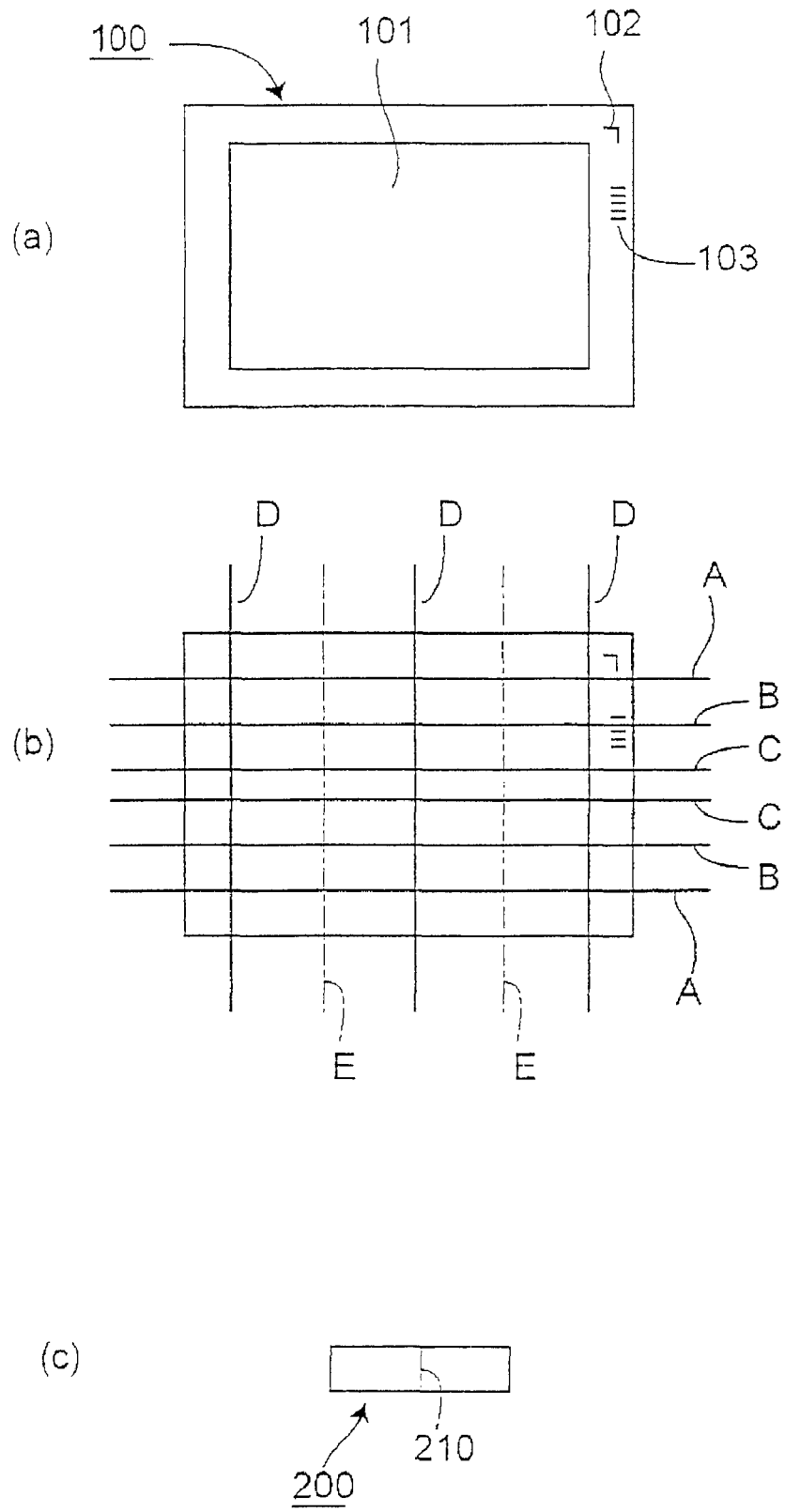
In FIG. 2, (a) is a view showing an example of a paper sheet that is processed by the paper sheet processing device in accordance with the first embodiment, (b) is a view illustrating the content of the processing, and (c) is a view showing a paper sheet obtained by the processing.

In FIG. 2, (a) shows an example of a paper sheet that is processed by the paper sheet processing device 1 in accordance with the present invention. On this paper sheet 100, a position mark 102 and a bar code 103 as well as a main printed part 101 are printed. The bar code 103 indicates processing information serving as the content of a series of processing to be performed for the paper sheet 100.

The paper sheet processing device 1 operates as described below.

First, paper sheets 100 are fed one by one from a bundle of the paper sheets 100 placed on the paper feeding part 11 to the carrying route 20, and enter the carrying correction means 803. If a paper sheet 100 having being fed is inclined, the carrying correction means 803 straighten it. Furthermore, if two or more paper sheets 100 having being fed overlap, the carrying correction means 803 detects the state and stops the carrying of the paper sheets 100. In the case that one paper sheet 100 has been fed straight, the paper sheet 100 is carried to the next stage.

The paper sheet 100 having been carried to the next stage enters the information reading means 804 after its leading end is detected by a paper sheet end sensor 201. The information reading means 804 reads the position mark 102 and the bar code 103 of the paper sheet 100 by a CCD sensor 805. This information having been read is sent to the control means 800. The control means 800 stores the information having been read and controls the subsequent various means on the basis of it. The processing information indicated by the bar code 103 has the following content, for example. In other words, the content is to obtain eight paper sheets 200 each having a fold 210 as shown in (c) in FIG. 2 by applying cutting processing along the solid lines A, B, C and D and fold forming processing along the alternate long and short dash lines E to the paper sheet 100 as shown in (b) in FIG. 2. In the case of such processing information, the subsequent various means operate as described below. The paper sheet 100, the information of which was unable to be read at the information reading means 804, is judged that printing is unclear and is dropped into a rejection tray 802 disposed downward by the rejection means 806 provided next.

The paper sheet 100 having passed through the rejection means 806 enters the first cutting device part 4A after its leading end is detected by a paper sheet end sensor 202. The first cutting device part 4A is ON-controlled by the processing control means of the control means 800, and is controlled by the position control means of the control means 800 so that two cutting cutters are positioned at the positions indicated by the two solid lines A ((b) in FIG. 2), respectively. Hence, the paper sheet 100 is cut along the solid lines A, that is, in the carrying direction, by the first cutting device part 4A. As a result, the paper sheet 100 has the shape shown in (a) in FIG. 3 and is carried to the second cutting device part 4B provided next. Unnecessary pieces X1 are dropped into the trash box 801.

Figure 3:
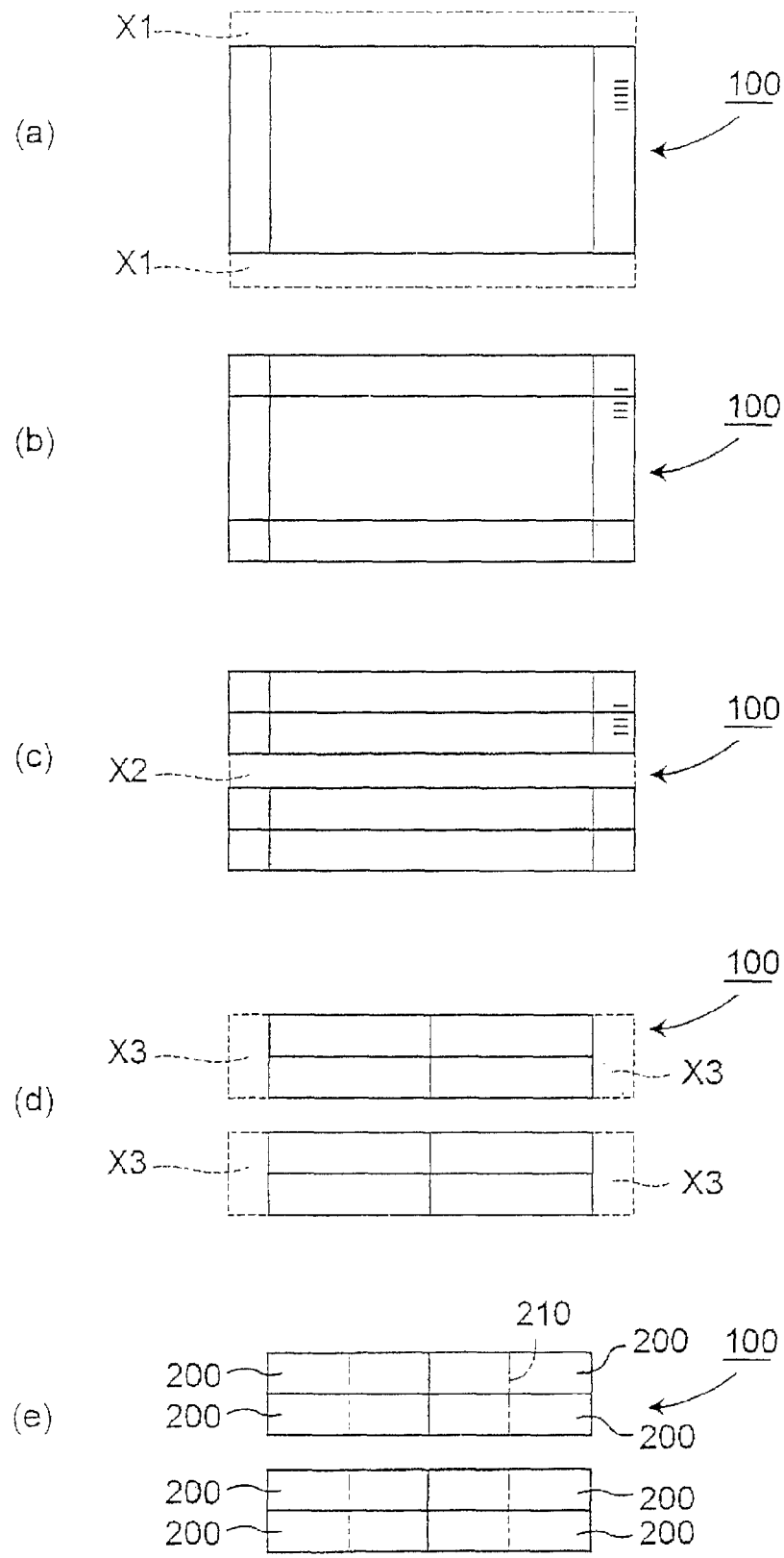
In FIG. 3, (a) is a view showing a paper sheet obtained after a first cutting device part in accordance with the first embodiment, (b) is a view showing a paper sheet obtained after a second cutting device part, (c) is a view showing a paper sheet obtained after a third cutting device part, (d) is a view showing a paper sheet obtained after a fourth cutting device part, and (e) is a view showing a paper sheet obtained after a fold forming device part.

The second cutting device part 4B is ON-controlled by the processing control means of the control means 800, and is controlled by the position control means of the control means 800 so that two cutting cutters are positioned at the positions indicated by the two solid lines B ((b) in FIG. 2), respectively. Hence, the paper sheet 100 shown in (a) in FIG. 3 is cut along the solid lines B, that is, in the carrying direction, by the second cutting device part 4B. As a result, the paper sheet 100 has the shape shown in (b) in FIG. 3 and is carried to the third cutting device part 4C provided next.

The third cutting device part 4C is ON-controlled by the processing control means of the control means 800, and is controlled by the position control means of the control means 800 so that two cutting cutters are positioned at the positions indicated by the two solid lines C ((b) in FIG. 2), respectively. Hence, the paper sheet 100 shown in (b) in FIG. 3 is cut along the solid lines C, that is, in the carrying direction, by the third cutting device part 4C. As a result, the paper sheet 100 has the shape shown in (c) in FIG. 3 and is carried to the fourth cutting device part 4D. An unnecessary piece X2 is dropped into the trash box 801 by the cutting waste dropping means 807 provided at the next stage.

Before the paper sheet 100 shown in (c) in FIG. 3 enters the fourth cutting device part 4D, its leading end is detected by a paper sheet end sensor 202.

The fourth cutting device part 4D is ON-controlled by the processing control means of the control means 800. In the fourth cutting device part 4D, each time the cutting position is detected by a cutting position sensor 204, the paper sheet 100 shown in (c) in FIG. 3 stops at the cutting position indicated by each of the three solid lines D ((b) in FIG. 2). Furthermore, each time the paper sheet 100 stops, it is cut along each of the solid lines D, that is, in the direction perpendicular to the carrying direction, by a pair of cutting cutters 41. Hence, the paper sheet 100 has the shape shown in (d) in FIG. 3 and is carried to the fold forming device part 5. Unnecessary pieces X3 are dropped into the trash box 801.

The fold forming device part 5 is ON-controlled by the processing control means of the control means 800. In the fold forming device part 5, each time a folding position is detected by a folding position sensor 205, the paper sheet 100 shown in (d) in FIG. 3 stops at the folding position indicated by each of the two alternate long and short dash lines E. Furthermore, each time the paper sheet 100 stops, a fold 201 is formed along each of the alternate long and short dash lines E, that is, in the direction perpendicular to the carrying direction, by a pair of fold forming pressure molds 51. Hence, the paper sheet 100 has the shape shown in (e) in FIG. 3 and is fed to the paper ejection part 12.

The paper sheet processing device 1 operates as described above.

In the present invention, the first to third cutting device parts 4A to 4C are installed detachably from the device body 10.

The first cutting device part 4A is taken as an example and described below specifically.

The first cutting device part 4A comprises a cutting unit 70X and a unit accommodating part 9. The cutting unit 70X is configured as a unit for performing cutting. The unit accommodating part 9 is formed in the device body 10 and can detachably accommodate the cutting unit 70X.

Figure 4:
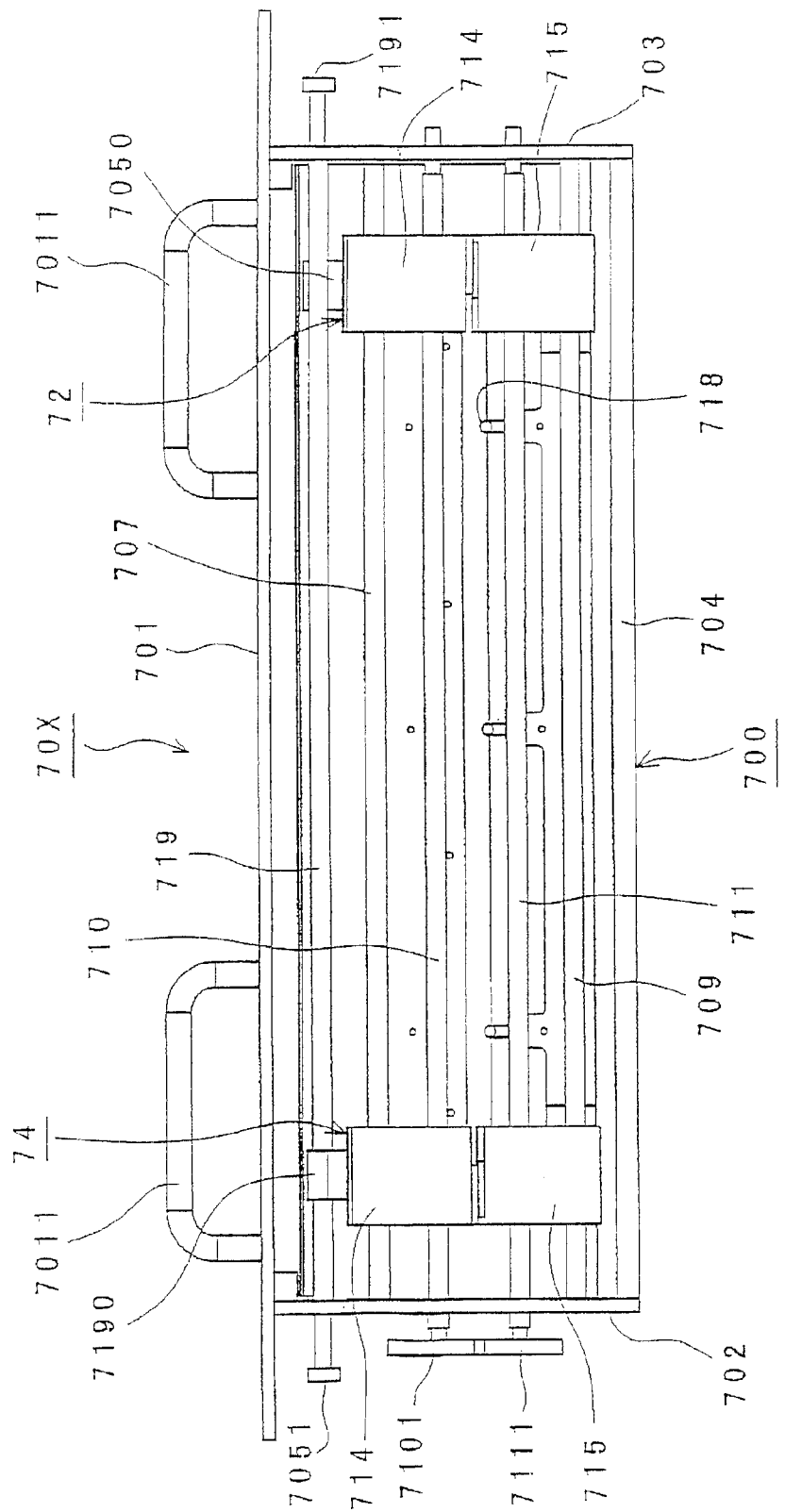
FIG. 4 is a front view showing a cutting unit.
Figure 5:
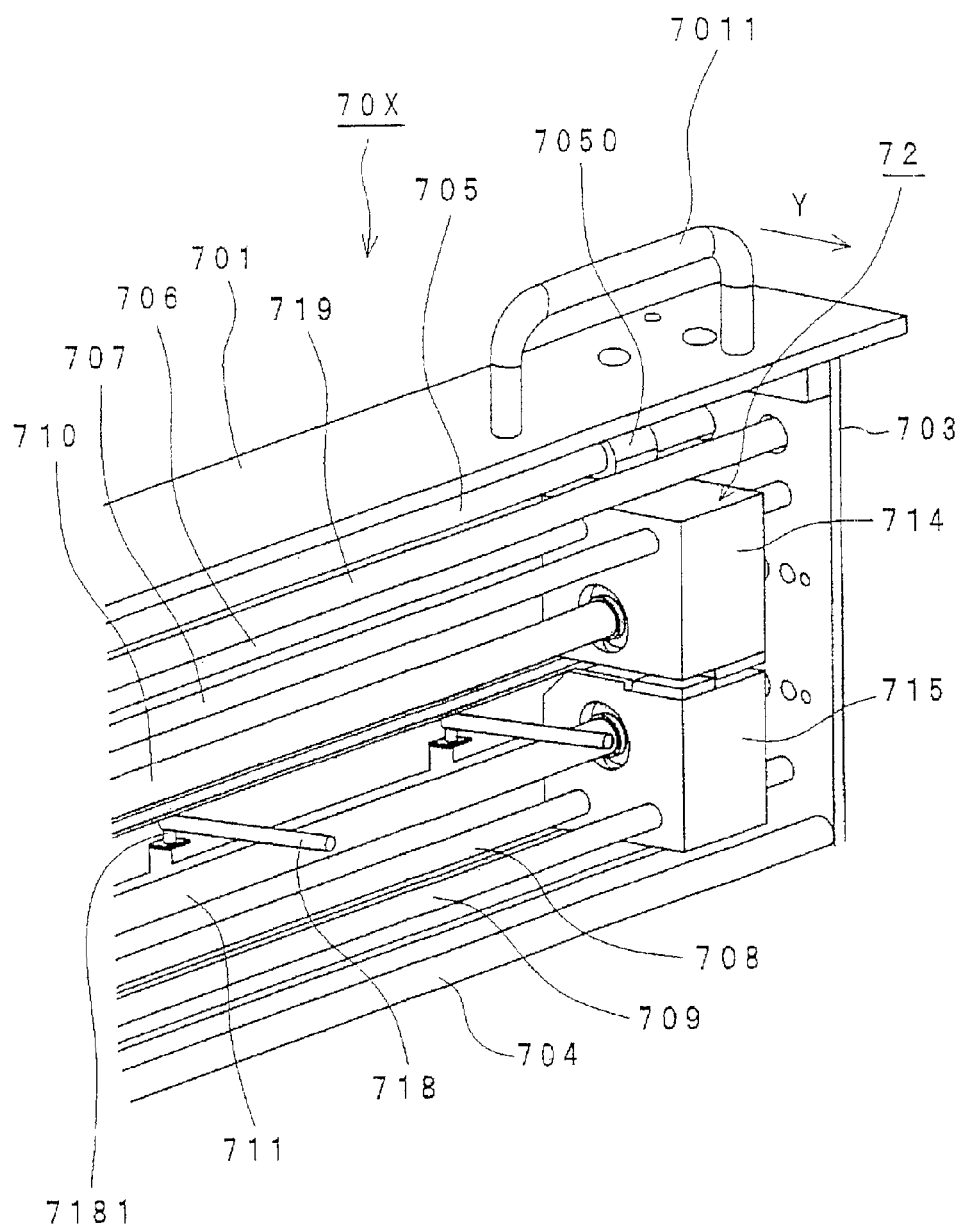
FIG. 5 is a fragmentary perspective view of FIG. 4.

FIG. 4 is a front view showing the cutting unit 70X, and FIG. 5 is a fragmentary perspective view of FIG. 4. The Y-direction in FIG. 5 indicates the carrying direction. The unit 70X is provided with a case part 700 and two cutting cutters (processing means) 72 and 74. The case part 700 comprises a top plate 701, two side plates 702 and 703, and a bottom frame 704. The two cutting cutters 72 and 74 are supported inside the case part 700. Two handles 7011 are attached on the top plate 701. The two side plates 702 and 703 are installed downward in the vertical direction from both sides of the top plate 701. Two screw shafts (moving means) 705 and 719, two upper guide shafts 706 and 707, two lower guide shafts 708 and 709, and two rotation shafts 710 and 711 are installed to span between the side plates 702 and 703. These shafts are all parallel. The two rotation shafts 710 and 711 are disposed at the upper and lower positions, respectively.

The cutting cutter 72 performs cutting by rubbing two rotary blades together up and down, and comprises an upper member 714 having an upper rotary blade and a lower member 715 having a lower rotary blade. In addition, the upper member 714 can move along the two upper guide shafts 706 and 707 as the screw shaft 705 passing through a screw engagement part 7050 rotates. Furthermore, the rotary blade of the upper member 714 is rotated by the rotation of the upper rotation shaft 710. The lower member 715 can move along the two lower guide shafts 708 and 709 together with the upper member 714. Furthermore, the rotary blade of the lower member 715 is rotated by the rotation of the lower rotation shaft 711.

The cutting cutter 74 has the same configuration as that of the cutting cutter 72 and is installed so as to be symmetrical with the cutting cutter 72. The cutting cutter 74 can move along the two upper guide shafts 706 and 707 as the screw shaft 719 rotates. The screw shaft 719 passes through a screw engagement part 7190. In addition, the rotary blade of the upper member 714 is rotated by the rotation of the upper rotation shaft 710. The lower member 715 can move along the two lower guide shafts 708 and 709 together with the upper member 714. Furthermore, the rotary blade of the lower member 715 is rotated by the rotation of the lower rotation shaft 711.

Moreover, the unit 70X is provided with pins 718 for supporting from below the paper sheets 100 passing through. The pins 718 are installed at three positions corresponding to the center and both sides of the paper sheet 100 in the width direction thereof. The pins 718 extend in the carrying direction and can pivot on a horizontal plane while the base ends 7181 thereof are used as fulcrums; when no external force is applied, they are configured to maintain the state of being directed in the carrying direction. Hence, when the pins 718 make contact with the cutting cutters 72 and 74, they are configured to keep away from the cutting cutters 72 and 74

In addition, a gear 7051 is installed at the end of the screw shaft 705 protruding from the side plate 702 to the outside. Furthermore, a gear 7191 is installed at the end of the screw shaft 719 protruding from the side plate 703 to the outside. Moreover, gears 7101 and 7111 are installed at the ends of the two rotation shafts 710 and 711 protruding from the side plate 702 to the outside, respectively. The two gears 7101 and 7111 are coupled together, whereby the two rotation shafts 710 and 711 rotate reversely at the same time.

Figure 6:
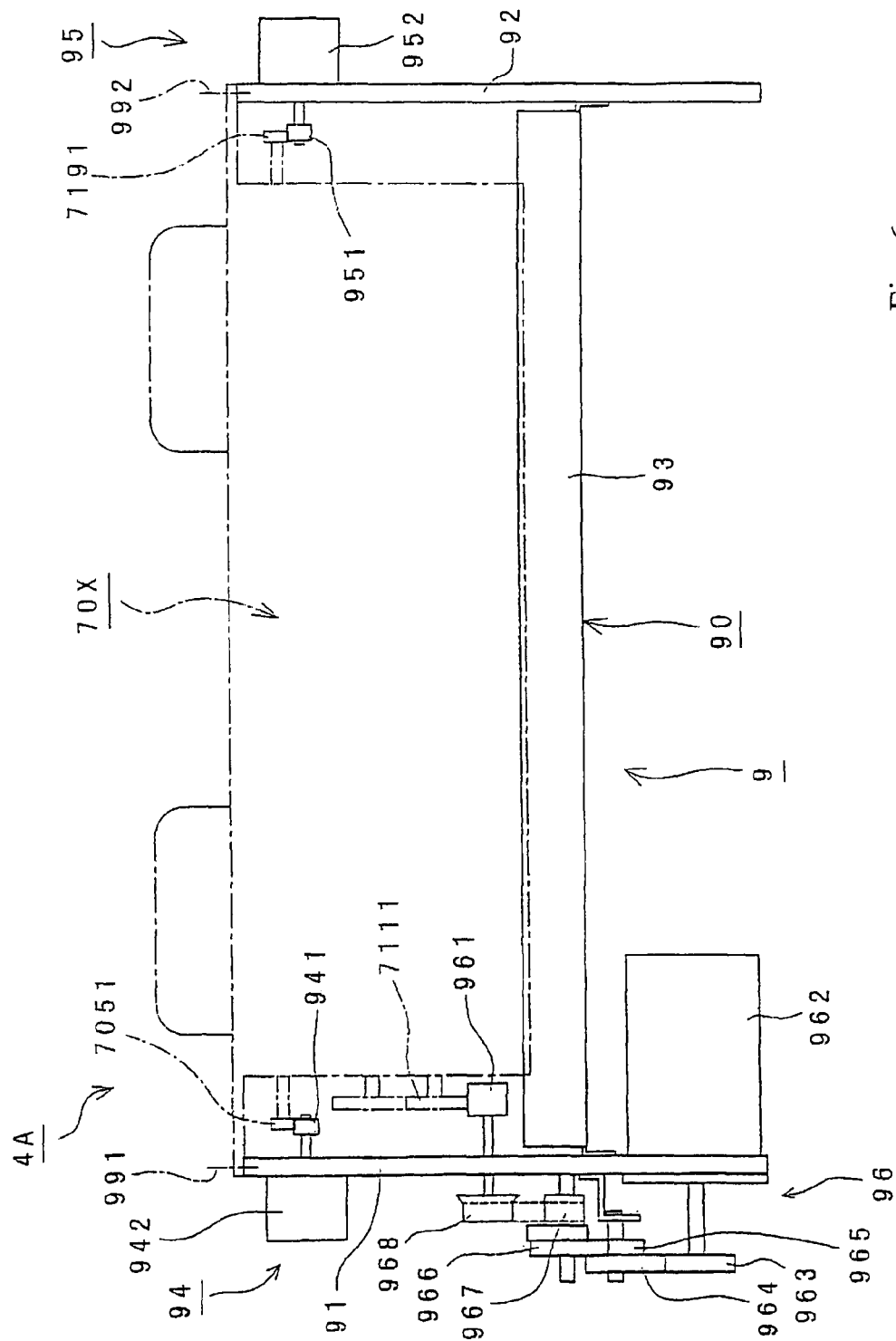
FIG. 6 is a front view showing a state wherein the cutting unit is accommodated in a unit accommodating part.

On the other hand, the unit accommodating part 9 is configured such that a first driving part 94, a second driving part 95 and a third driving part 96 are installed in a frame member 90 as shown in FIG. 6. The frame member 90 comprises two side plates 91 and 92 and a lower frame 93.

The first driving part 94 is installed on the upper part of the side plate 91 and comprises a gear 941 and a motor 942 for rotating the gear 941. The gear 941 is positioned inside the side plate 91. The motor 942 is positioned outside the side plate 91.

The second driving part 95 is installed on the upper part of the side plate 92 and comprises a gear 951 and a motor 952 for rotating the gear 951. The gear 951 is positioned inside the side plate 92. The motor 952 is positioned outside the side plate 92. The first driving part 94 and the second driving part 95 are installed symmetrically.

The third driving part 96 is installed at the lower part of the side plate 91 and comprises a gear 961, a motor 962, gears 963, 964, 965 and 966, and pulleys 967 and 968. The gear 961 is positioned inside the side plate 91 and above the lower frame 93. The motor 962 is positioned inside the side plate 91 and below the lower frame 93. The gears 963, 964, 965 and 966 and the pulleys 967 and 968 are positioned outside the side plate 91 to transmit the driving force of the motor 962 to the gear 961.

The gear 961 of the third driving part 96 protrudes inside the side plate 91 further than the gear 941 of the first driving part 94.

In addition, in the first cutting device part 4A, when the unit 70X is accommodated in the unit accommodating part 9 in the first cutting device part 4A, the gear 7051 is coupled with the gear 941, the gear 7111 is coupled with the gear 961, and the gear 7191 is coupled with the gear 951 as shown in FIG. 6. The unit 70X accommodated in the unit accommodating part 9 is positioned and then secured to the side plates 91 and 92 by screws 991 and 992.

When the unit 70X is accommodated in the unit accommodating part 9, the first cutting device part 4A operates as described below. That is to say, the unit 70X is ON-controlled by the processing control means of the control means 800, and is controlled by the position control means of the control means 800 so that the two cutting cutters 72 and 74 are positioned at the cutting positions. In other words, by the position control means, the motor 942 of the first driving part 94 is operated for a predetermined time period, and the cutting cutter 72 is moved to its cutting position, and, additionally, the motor 952 of the second driving part 95 is operated for a predetermined time period, and the cutting cutter 74 is moved to its cutting position. Furthermore, by the processing control means, the motor 962 of the third driving part 96 is operated, the rotary blades of the cutting cutters 72 and 74 are rotated, and the paper sheet 100 is cut at the positions of the cutting cutters 72 and 74 in the carrying direction.

Figure 7:
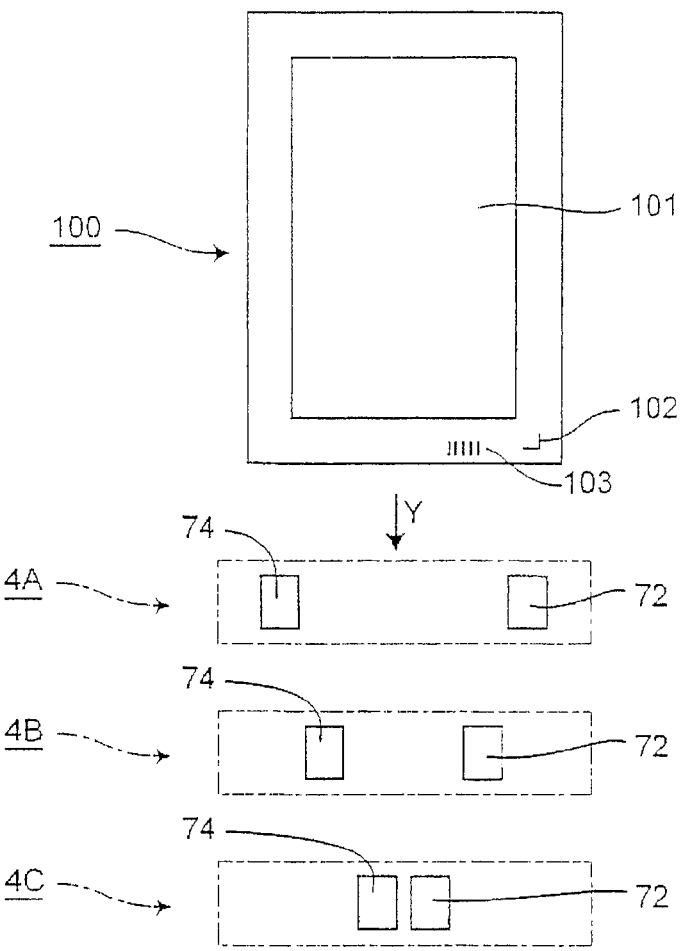
FIG. 7 is a schematic plan view showing the first to third cutting device parts.

The second cutting device parts 4B and 4C have the same configuration as that of the first cutting device part 4A, and operate similarly. In addition, the first, second and third cutting device parts 4A, 4B and 4C each control the cutting cutters 72 and 74 to the positions shown in FIG. 7 serving as a schematic plan view, thereby performing the cutting described above.

As described above, in the paper sheet processing device 1 having the configuration described above, the cutting units for performing cutting in the first, second and third cutting device parts 4A, 4B and 4C, respectively, are installed detachably from the device body 10; hence, the following effects can be achieved. That is to say, even in the case that the cutting cutter of one of the cutting device parts, for example, the first cutting device part 4A, is required to be replaced because of abrasion or the like, replacement can be performed simply by taking the cutting unit 70X from the unit accommodating part 9 of the device body 10 and by accommodating a new cutting unit 70X being prepared as a spare in the unit accommodating part 9. Hence, time and effort required for replacement work can be reduced.

In addition, in the paper sheet processing device 1 having the configuration described above, even in the case that the first cutting device part 4A, for example, is configured as the cutting unit 70X, the movement control of the positions of the cutting cutters 72 and 74 can be performed in the unit 70X; hence, application to various kinds of cutting positions is possible, and proper cutting can be performed even in the case that the printed position of the paper sheet 100 is misaligned.

Furthermore, in the paper sheet processing device 1 having the fold forming device part for forming folds in the carrying direction and a perforation forming device part for forming perforations in the carrying direction, the fold forming device part and the perforation forming device part may be installed detachably from the device body 10.

Figure 8:
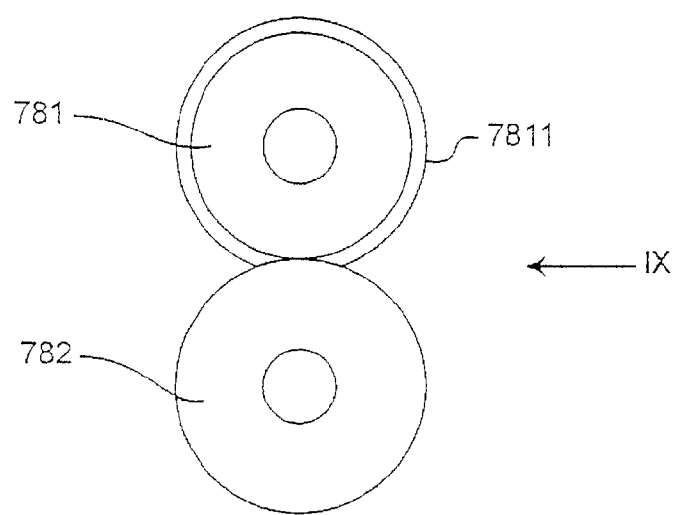
FIG. 8 is a view showing the blades of a fold forming unit.
Figure 9:
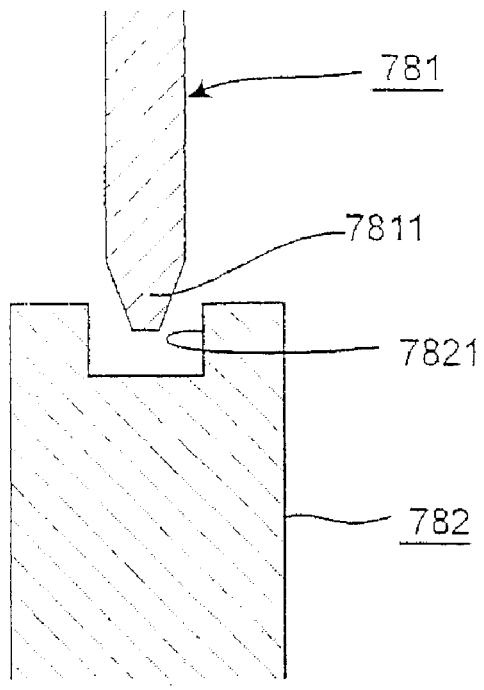
FIG. 9 is a view taken in the direction of arrow IX of FIG. 8.

In the case that the fold forming device part for forming folds in the carrying direction is installed detachably from the device body 10, the fold forming device part comprises a fold forming unit and the unit accommodating part 9. The fold forming unit is configured such that the cutting cutter of the cutting unit 70X is replaced with a fold forming tool. As shown in FIG. 8 and FIG. 9 serving as a view taken in the direction of arrow IX of FIG. 8, the fold forming tool operates to fit the convex part 7811 of a rotary blade 781 into the concave part 7821 of a receiving blade 782 together with a paper sheet to press the paper sheet, thereby forming a fold on the paper sheet. The rotary blade 781 is held in the upper member 714 and is rotated by the rotation of the rotation shaft 710. The receiving blade 782 is held in the lower member 715 and is rotated by the rotation of the rotation shaft 711. The height of the receiving blade 782 can be changed by applying an eccentric shaft; hence, the depth of the fold can be adjusted by changing the fitting depth of the convex part 7811 with respect to the concave part 7821.

Figure 10:
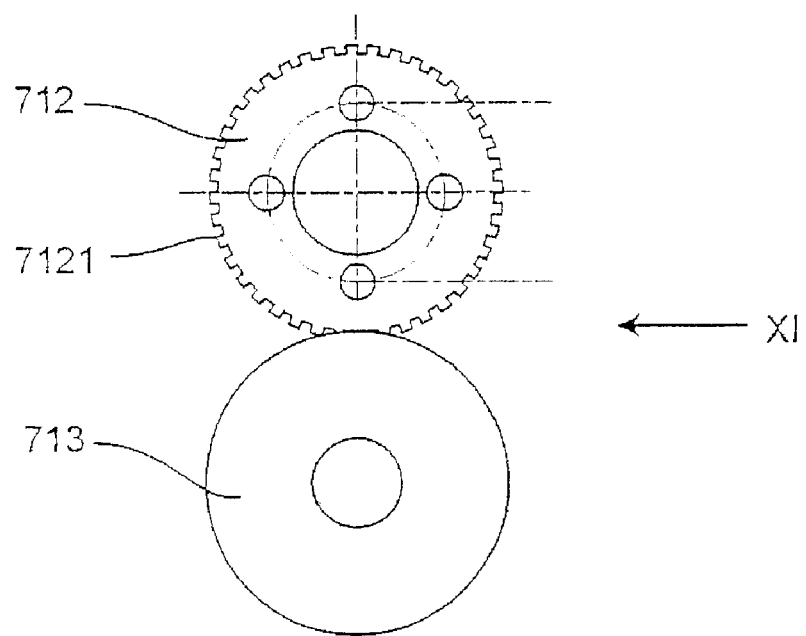
FIG. 10 is a view showing the blades of a perforation forming unit.
Figure 11:
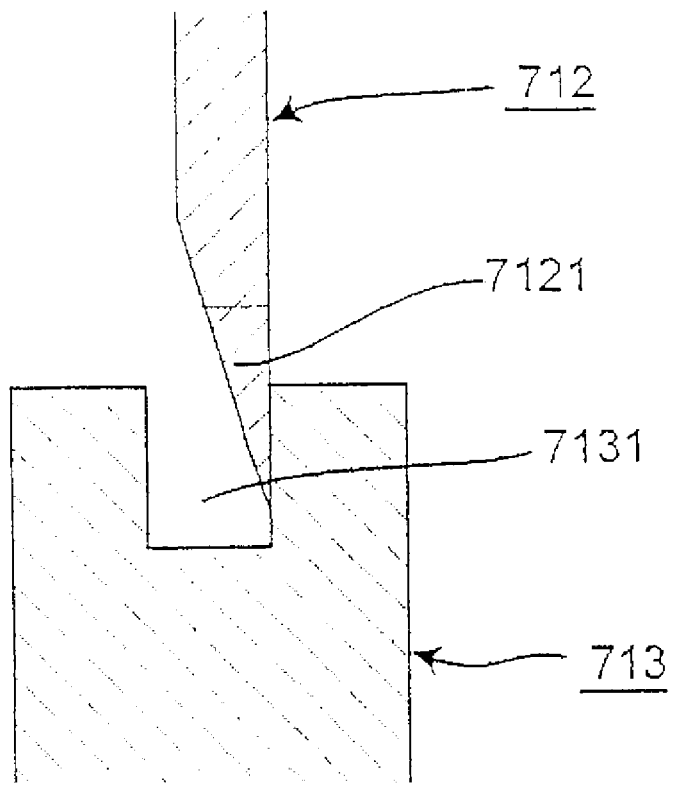
FIG. 11 is a view taken in the direction of arrow XI of FIG. 10.

In the case that the perforation forming device part for forming perforations in the carrying direction is installed detachably from the device body 10, the perforation forming device part comprises a perforation forming unit and the unit accommodating part 9. The perforation forming unit is configured such that the cutting cutter of the cutting unit 70X is replaced with a perforation forming tool. As shown in FIG. 10 and FIG. 11 serving as a view taken in the direction of arrow XI of FIG. 10, the perforation forming tool operates to slidingly contact the sharp edge part 7121 of a gear blade 712 with the wall of the concave part 7131 of a receiving blade 713 together with a paper sheet to form perforations in the paper sheet. The gear blade 712 is held in the upper member 714 and is rotated by the rotation of the rotation shaft 710. The receiving blade 713 is held in the lower member 715 and is rotated by the rotation of the rotation shaft 711. The height of the receiving blade 713 can be changed by applying an eccentric shaft; hence, the width of the perforation can be adjusted by changing the fitting depth of the sharp edge part 7121 with respect to the concave part 7131.

In the embodiment described above, the position mark 102 and the bar code 103 printed on the paper sheet 100 are read, and the device itself automatically performs the movement control of the positions of the processing means, such as the cutting cutters, on the basis of the information having been read; however, the paper sheet processing device in accordance with the present invention is not limited to have this kind of configuration; for example, an embodiment described below can be adopted. That is to say, the content of processing (the dimensions of paper sheets, the type of processing, etc.) and processing positions are input from an operation panel (not shown) and preset as processing forms. At the time of processing, a processing form being set is selected. Hence, the movement control of the positions of the processing means is performed, and paper sheet processing corresponding to the selected processing form is done.

Second Embodiment

Figure 12:
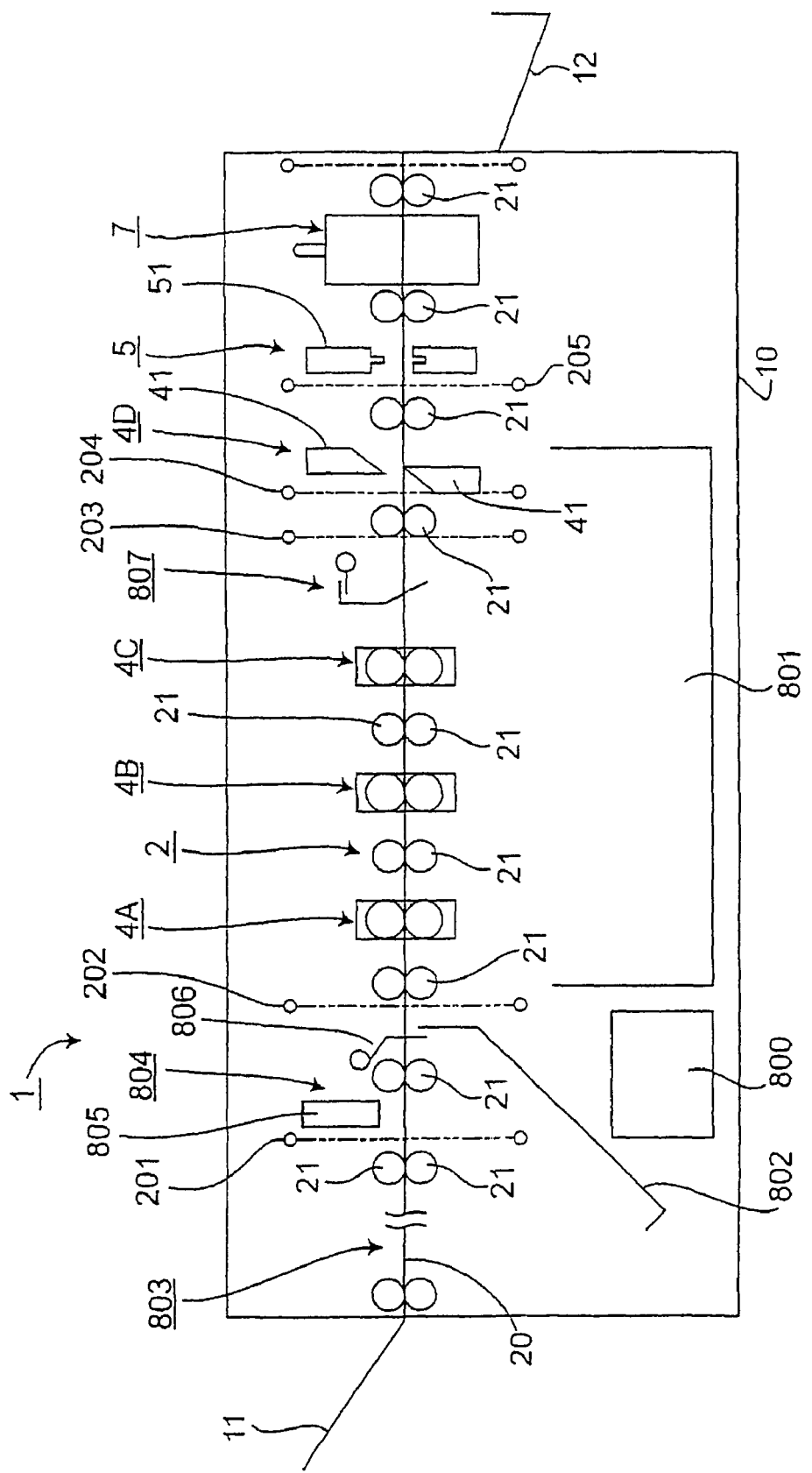
FIG. 12 is a schematic vertical sectional view showing the whole of a paper sheet processing device in accordance with a second embodiment of the present invention.

FIG. 12 is a schematic vertical sectional view showing the whole of a paper sheet processing device in accordance with a second embodiment of the present invention. In FIG. 12, the same components as those shown in FIG. 1 are designated by the same numerals. A paper sheet processing device 1 is provided with a paper feeding part 11 comprised of a paper feeding tray and a paper ejection part 12 comprised of a paper ejection tray on both ends of the device body 10 thereof. A carrying route 20 is formed of carrier means 2 comprising multiple pairs of rollers 21 in the range from the paper feeding part 11 to the paper ejection part 12. In addition, carrier driving means (not shown) are connected to the carrier means 2. Furthermore, a carrying correction means 803, an information reading means 804, a rejection means 806, a first cutting device part 4A, a second cutting device part 4B, a third cutting device part 4C, a cutting waste dropping means 807, a fourth cutting device part 4D, a fold forming device part 5 and an optional processing device part (second type processing device part) 7 are installed on the carrying route 20 from the side of the paper feeding part 11. These are all supported on the device body 10. Furthermore, processing driving means (not shown) are connected to these means.

Besides, the paper sheet processing device 1 is provided with a control means 800 for controlling the operation of the whole device inside the device body 10. The control means 800 has a CPU connected to an operation panel (not shown). The control means 800 also performs control, for example, as a position control means and a processing control means, these being described later. Moreover, the paper sheet processing device 1 has a trash box 801 for accommodating cutting waste generated by cutting paper sheets at the bottom part inside the device body 10.

In the paper sheet processing device 1 in accordance with this embodiment, the configuration and operation of the parts from the paper feeding part 11 to the fold forming device part 5 are the same as those in accordance with the first embodiment. In other words, the paper sheet 100 shown in (a) in FIG. 2 is fed to the optional processing device part 7 while having the shape shown in (e) in FIG. 3.

Next, the configuration of the optional processing device part 7 will be described.

Figure 13:
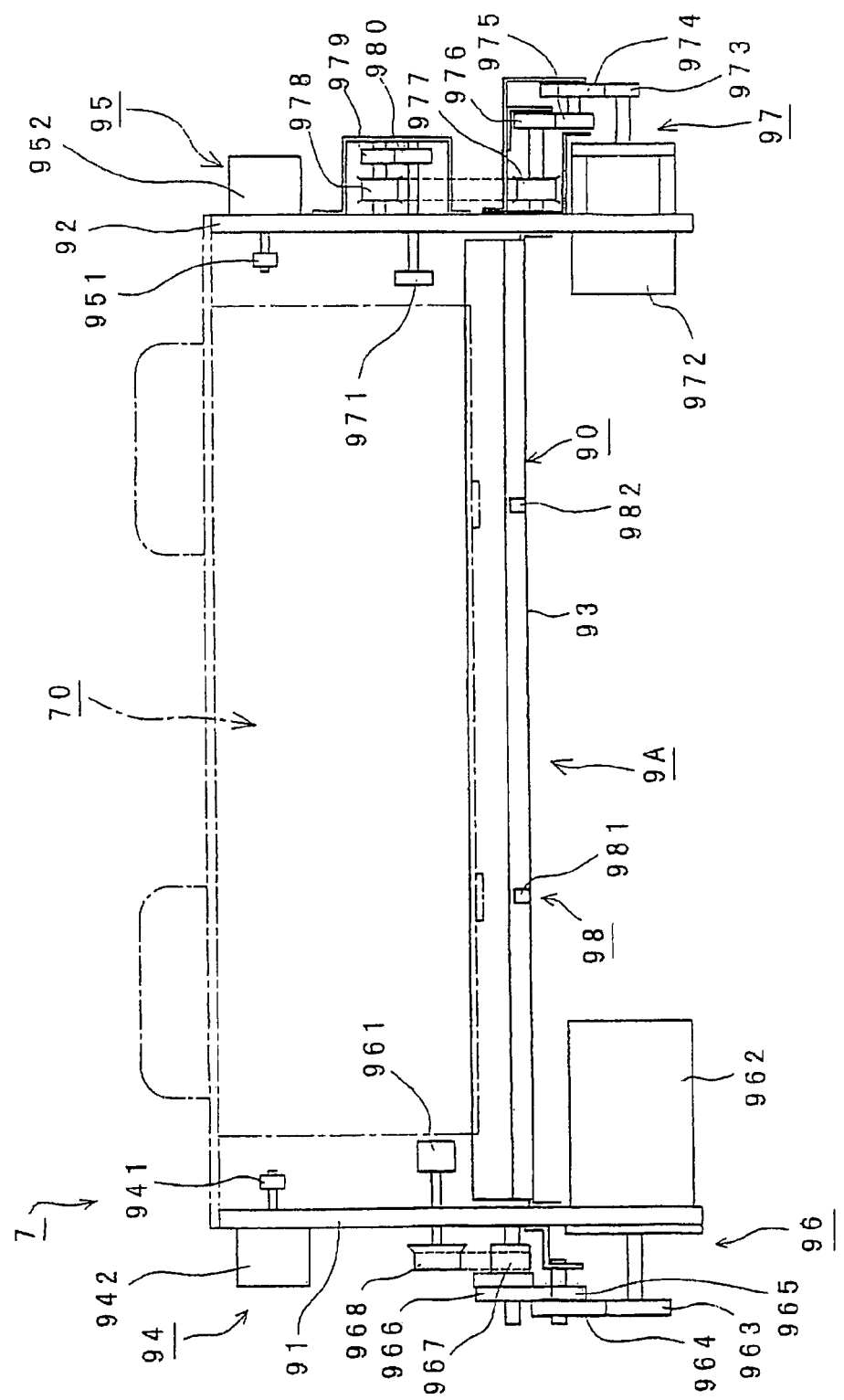
FIG. 13 is a front view showing the unit accommodating part of an optional processing means.

In the optional processing device part 7, a processing content can be selected as desired from among multiple kinds of contents. More specifically, the optional processing device part 7 comprises multiple processing units 70 and a unit accommodating part 9A as shown in FIG. 13. The multiple processing units 70 are multiple processing means for performing processing of different kinds of contents, each being configured as a unit. The unit accommodating part 9A is installed in the device body 10 and can detachably accommodate a processing unit that is selected as desired from among the processing units 70.

The unit accommodating part 9A is configured such that a first driving part 94, a second driving part 95, a third driving part 96, a fourth driving part 97 and a detection part (processing type detecting means) 98 are installed on a frame member 90. The frame member 90 comprises two side plates 91 and 92 and a lower frame 93.

The first driving part 94 is installed on the upper part of the side plate 91 and comprises a gear 941 and a motor 942 for rotating the gear 941. The gear 941 is positioned inside the side plate 91. The motor 942 is positioned outside the side plate 91. The second driving part 95 is installed on the upper part of the side plate 92 and comprises a gear 951 and a motor 952 for rotating the gear 951. The gear 951 is positioned inside the side plate 92. The motor 952 is positioned outside the side plate 92. The first driving part 94 and the second driving part 95 drive screw shafts for moving the positions of processing means (for example, cutting cutters, perforation forming tool, fold forming tool, etc.). In the case that a processing means comprises two cutting cutters, for example, the first driving part 94 and the second driving part 95 are installed symmetrically on both the side plate 91 and the side plate 92 so as to correspond to the respective cutting cutters.

The third driving part 96 is installed at the lower part of the side plate 91 and comprises a gear 961, a motor 962, gears 963, 964, 965 and 966, and pulleys 967 and 968. The gear 961 is positioned inside the side plate 91 and above the lower frame 93. The motor 962 is positioned inside the side plate 91 and below the lower frame 93. The gears 963, 964, 965 and 966 and the pulleys 967 and 968 are positioned outside the side plate 91 to transmit the driving force of the motor 962 to the gear 961. The third driving part 96 drives a processing means (for example, a business card cutting tool having multiple rotary blades) requiring large power for processing. Hence, the motor 962 has a large driving force.

The fourth driving part 97 is installed at the lower part of the side plate 92 and comprises a gear 971, a motor 972, gears 973, 974, 975 and 976, pulleys 977 and 978, and gears 979 and 980. The gear 971 is positioned inside the side plate 92 and above the lower frame 93. The motor 972 is positioned inside the side plate 92 and below the lower frame 93. The gears 973, 974, 975 and 976, the pulleys 977 and 978 and the gears 979 and 980 are positioned outside the side plate 92 to transmit the driving force of the motor 972 to the gear 971. The fourth driving part 97 drives a general processing means (for example, cutting cutters, perforation forming tool, fold forming tool and carrying rollers) not requiring large power for processing. Hence, the motor 972 has a driving force required.

The gear 961 of the third driving part 96 protrudes inside the side plate 91 further than the gear 941 of the first driving part 94. The gear 971 of the fourth driving part 97 protrudes inside the side plate 92 further than the gear 951 of the second driving part 95.

The detection part 98 comprises optical sensors 981 and 982 installed at two positions of the lower frame 93.

In addition, as multiple processing units 70 capable of being accommodated detachably in the unit accommodating part 9A and being driven, for example, a perforation forming unit 70A (FIG. 14) for forming perforations in paper sheets, a cutting unit 70B (FIG. 17) for cutting paper sheets in the carrying direction, a business-card-only unit 70C (FIG. 19) for cutting paper sheets to the width of business cards, a carrying unit 70D (FIG. 21) for simply carrying paper sheets are prepared.

Figure 14:
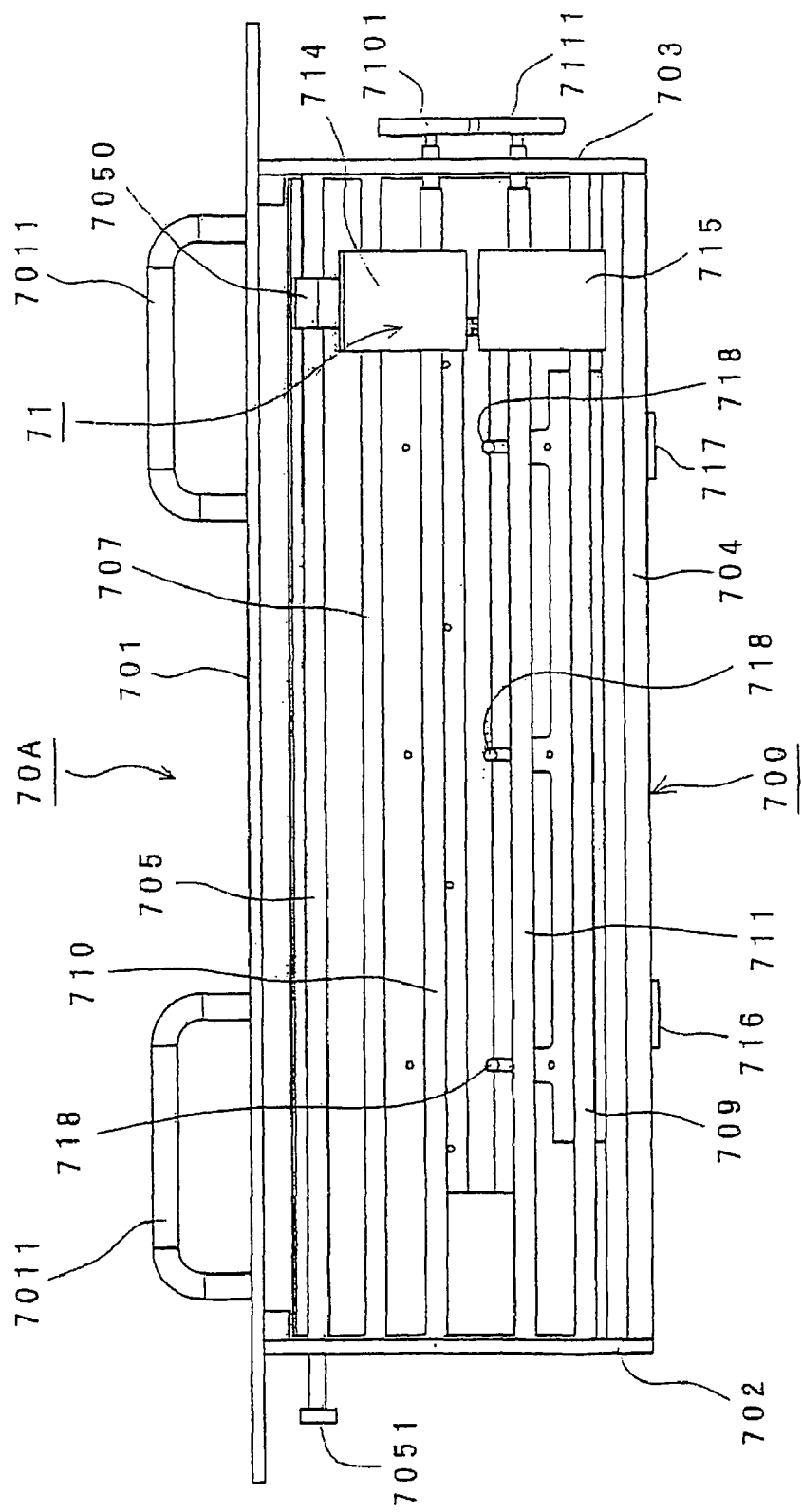
FIG. 14 is a front view showing the perforation forming unit.
Figure 15:
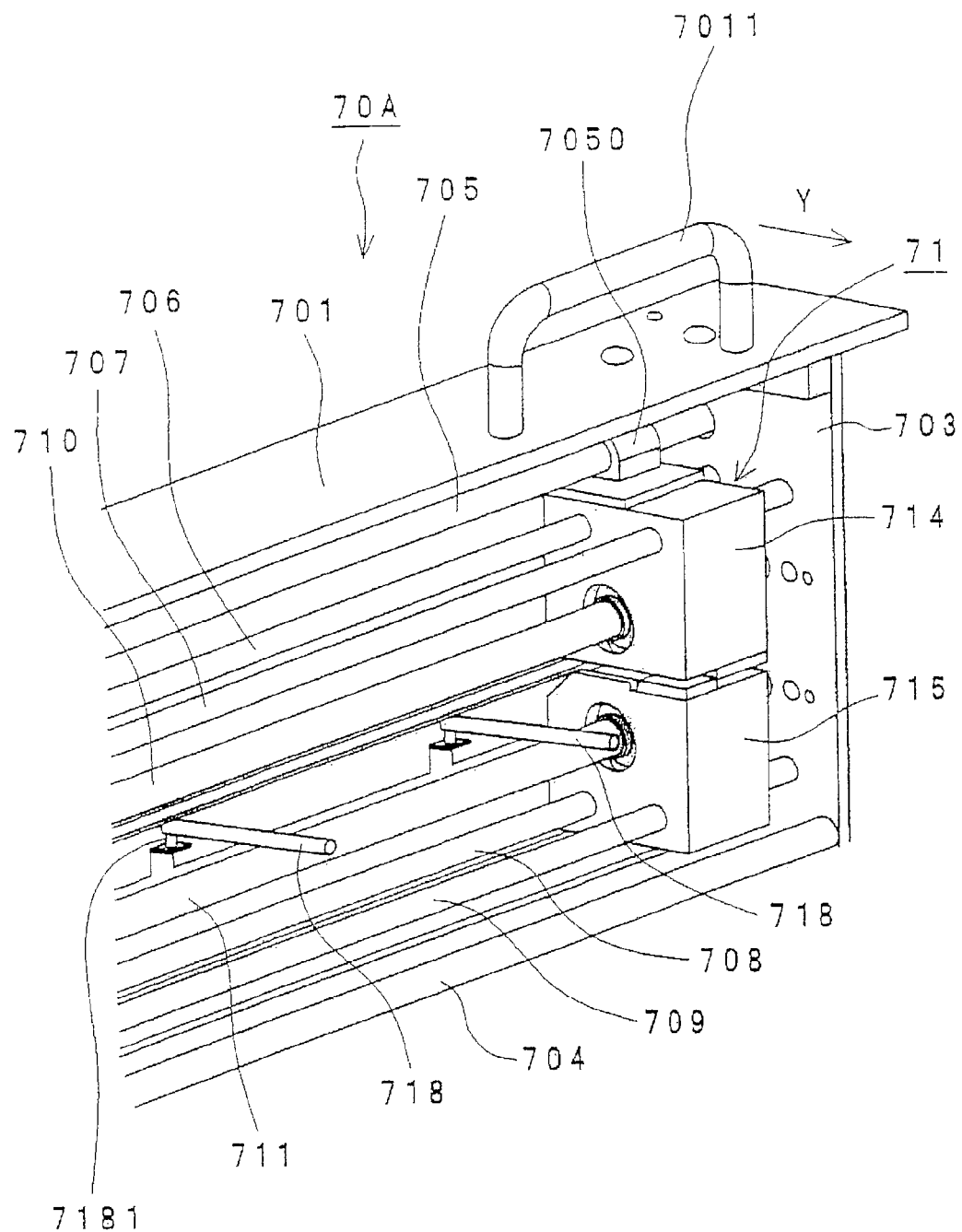
FIG. 15 is a fragmentary perspective view of FIG. 14.

FIG. 14 is a front view showing the perforation forming unit 70A, and FIG. 15 is a fragmentary perspective view of FIG. 14. The Y-direction in FIG. 15 indicates the carrying direction. The unit 70A is provided with a case part 700 and one perforation forming tool (processing means) 71. The case part 700 comprises a top plate 701, two side plates 702 and 703, and a bottom frame 704. The perforation forming tool 71 is supported inside the case part 700. Two handles 7011 are attached on the top plate 701. The two side plates 702 and 703 are installed downward in the vertical direction from both sides of the top plate 701. One screw shaft (moving means) 705, two upper guide shafts 706 and 707, two lower guide shafts 708 and 709, and two rotation shafts 710 and 711 are installed to span between the side plates 702 and 703. These shafts are all parallel. The two rotation shafts 710 and 711 are disposed at the upper and lower positions.

As shown in FIG. 10 and FIG. 11 serving as a view taken in the direction of arrow XI of FIG. 10, the perforation forming tool 71 operates to slidingly contact the sharp edge part 7121 of a gear blade 712 with the wall of the concave part 7131 of a receiving blade 713 together with a paper sheet to form perforations in the paper sheet. The perforation forming tool 71 has an upper member 714 for holding a gear blade 712 and a lower member 715 for holding a receiving blade 713. In addition, the upper member 714 can move along the two upper guide shafts 706 and 707 as the screw shaft 705 passing through a screw engagement part 7050 rotates. Furthermore, the gear blade 712 is rotated by the rotation of the upper rotation shaft 710. The lower member 715 can move along the two lower guide shafts 708 and 709 together with the upper member 714. Furthermore, the receiving blade 713 is rotated by the rotation of the lower rotation shaft 711. The height of the receiving blade 713 can be changed by applying an eccentric shaft; hence, the width of the perforation can be adjusted by changing the fitting depth of the sharp edge part 7121 with respect to the concave part 7131.

In addition, light-shielding plates 716 and 717 are installed at two positions on the bottom frame 704. The light-shielding plates 716 and 717 are installed at positions opposed to the optical sensors 981 and 982 at the time when the unit 70A is accommodated in the unit accommodating part 9A.

Furthermore, the unit 70A is provided with pins 718 for supporting from below the paper sheets 100 passing through. The pins 718 are installed at three positions corresponding to the center and both sides of the paper sheet 100 in the width direction thereof. The pins 718 extend in the carrying direction and can pivot on a horizontal plane while the base ends 7181 are used as fulcrums; when no external force is applied, they are configured to maintain the state of being directed in the carrying direction. Hence, when the pins 718 make contact with the perforation forming tool 71, they are configured to keep away from the perforation forming tool 71.

In addition, a gear 7051 is installed at the end of the screw shaft 705 protruding from the side plate 702 to the outside. Furthermore, gears 7101 and 7111 are installed at the ends of the two rotation shafts 710 and 711 protruding from the side plate 703 to the outside. The two gears 7101 and 7111 are coupled together, whereby the two rotation shafts 710 and 711 rotate reversely at the same time.

Figure 16:
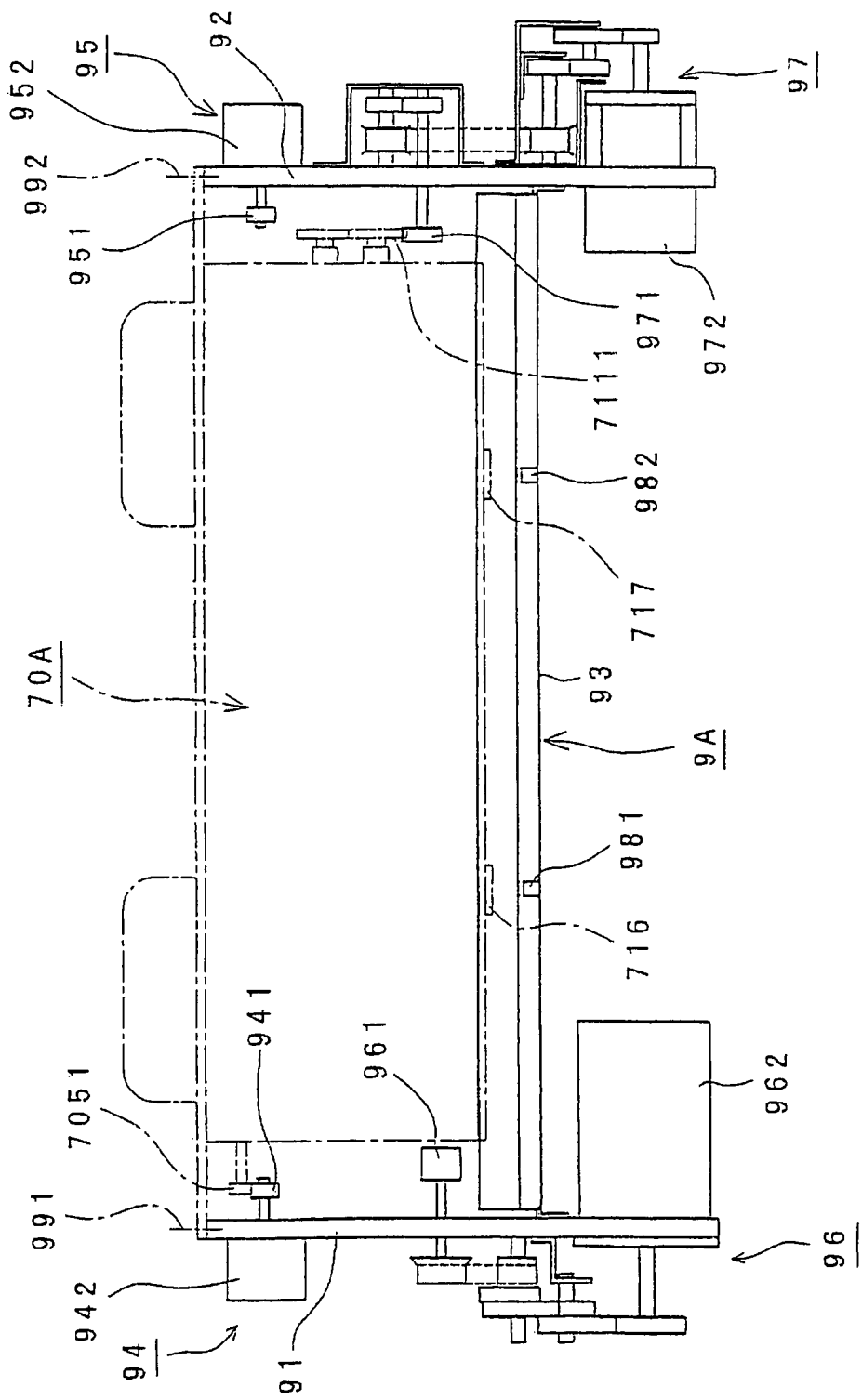
FIG. 16 is a front view showing a state wherein the perforation forming unit is accommodated in the unit accommodating part.

Furthermore, when the unit 70A is accommodated in the unit accommodating part 9A in the optional processing device part 7, the gear 7051 is coupled with the gear 941, and the gear 7111 is coupled with the gear 971 as shown in FIG. 16. The unit 70A accommodated in the unit accommodating part 9A is positioned and then secured to the side plates 91 and 92 by screws 991 and 992.

Figure 17:
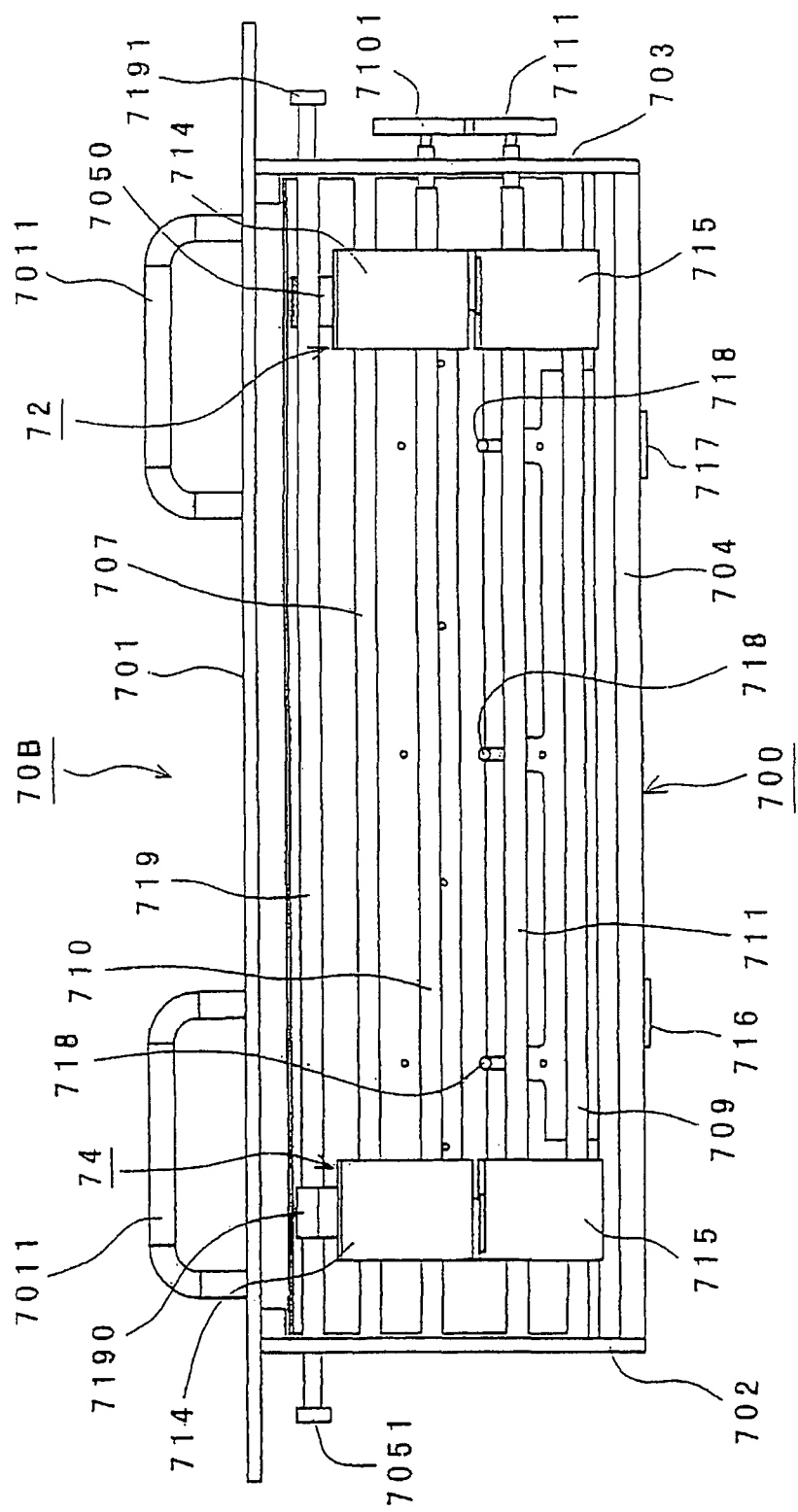
FIG. 17 is a front view showing a cutting unit.
Figure 18:
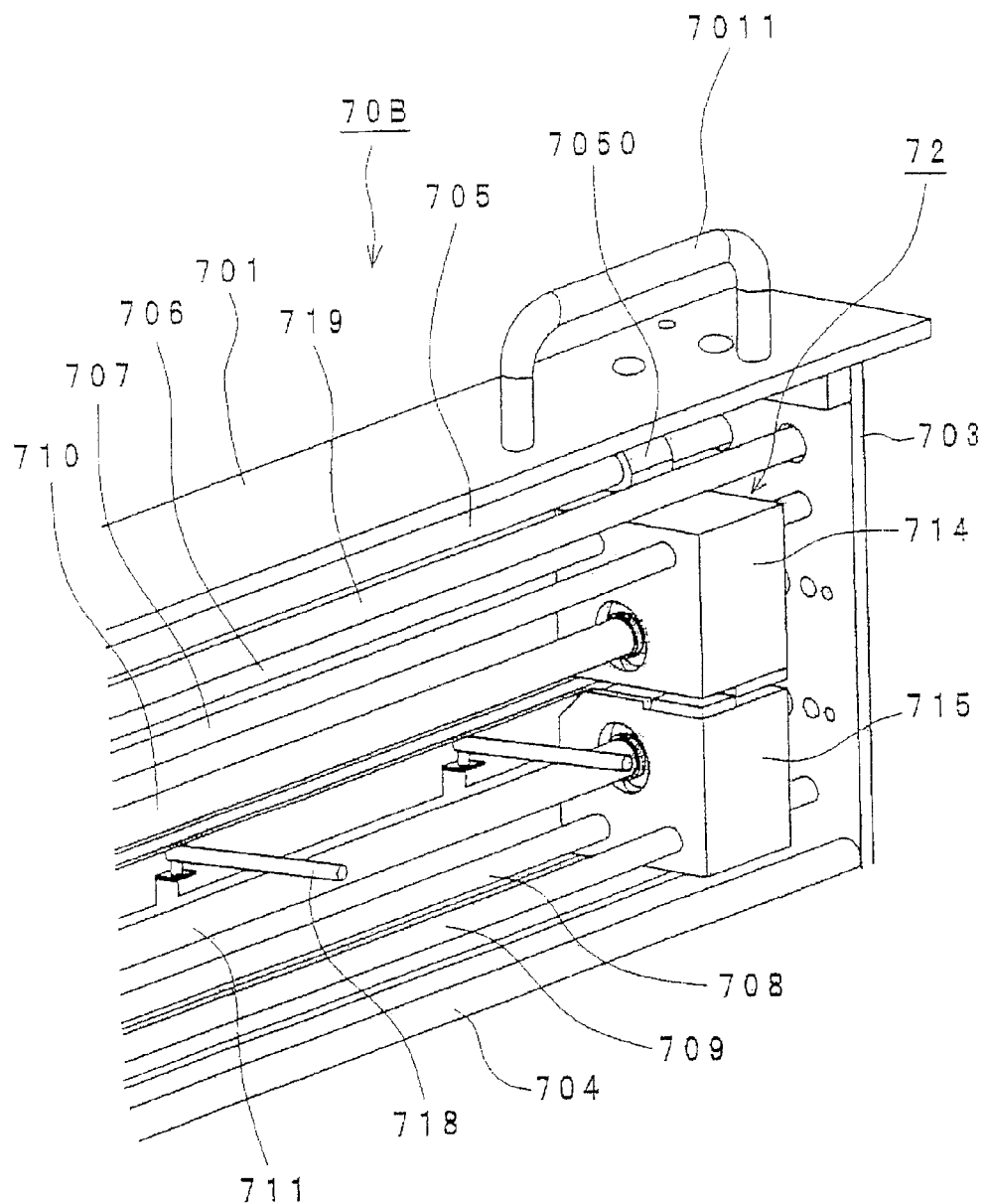
FIG. 18 is a fragmentary perspective view of FIG. 17.

FIG. 17 is a front view showing the cutting unit 70B, and FIG. 18 is a fragmentary perspective view of FIG. 17. The cutting unit 70B has two cutting cutters (processing means) 72 and 74 inside the case part 700. Hence, in addition to the screw shaft (moving means) 705 for moving the cutting cutter 72, a screw shaft (moving means) 719 for moving the cutting cutter 74 is also provided. The cutting cutter corresponds to the perforation forming tool 71 of the unit 70A, but performs cutting by rubbing two rotary blades together up and down. In the cutting cutter, the upper rotary blade corresponds to the gear blade 712 of the perforation forming tool 71, and the lower rotary blade corresponds to the receiving blade 713 of the perforation forming tool 71. In addition, a gear 7191 is installed at the end of the screw shaft 719 protruding from the side plate 703 to the outside. The cutting cutters 72 and 74 are installed symmetrically. The other configurations are the same as those of the unit 70A.

Furthermore, when the unit 70B is accommodated in the unit accommodating part 9A in the optional processing device part 7, the gear 7051 is coupled with the gear 941, the gear 7111 is coupled with the gear 971, and the gear 7191 is coupled with the gear 951.

Figure 19:
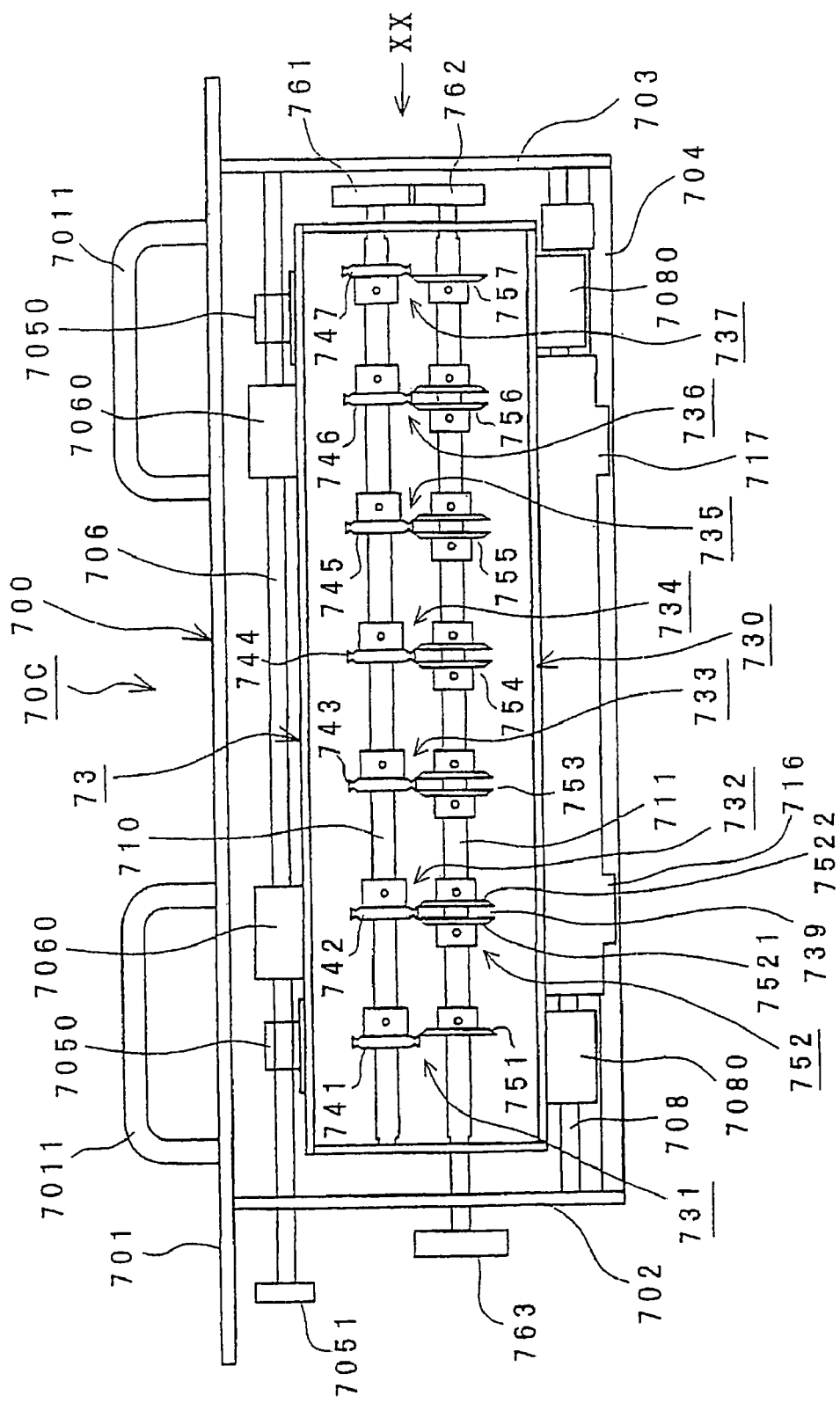
FIG. 19 is a front view showing a business-card-only unit.
Figure 20:
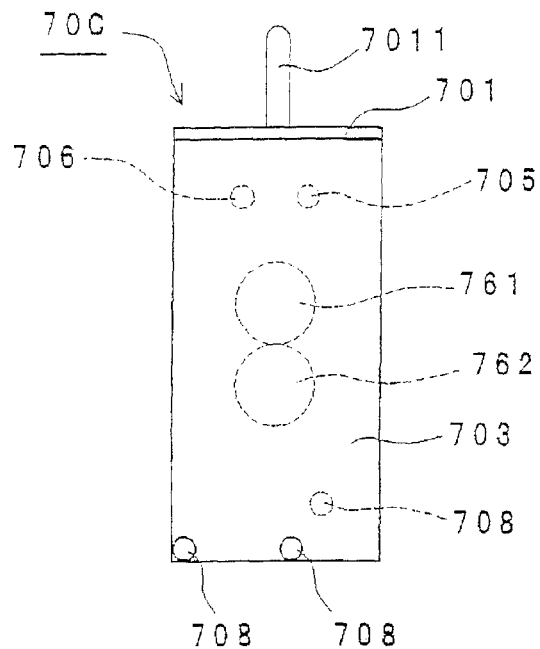
FIG. 20 is a view taken in the direction of arrow XX of FIG. 19.

FIG. 19 is a front view showing the business-card-only unit 70C, and FIG. 20 is a view taken in the direction of arrow XX of FIG. 19. The unit 70C has one business card cutting tool (processing means) 73 inside the case part 700. One screw shaft (moving means) 705, one upper guide shaft 706, one lower guide shaft 708, and two rotation shafts 710 and 711 are installed to span between the side plates 702 and 703. These shafts are all parallel. The two rotation shafts 710 and 711 are disposed at the upper and lower positions.

The business card cutting tool 73 is comprised of a case 730 in which seven cutters 731 to 737 are provided at equal intervals. In the business card cutting tool 73, the case 730 can move along the upper guide shaft 706 and the lower guide shaft 708 as the screw shaft 705 rotates. The screw shaft 705 passes through the two screw engagement part 7050. The upper guide shaft 706 passes through two through-passing parts 7060. The lower guide shaft 708 passes through the two through-passing parts 7080. The end of the screw shaft 705 protruding from the side plate 702 to the outside has a gear 7051 at its tip. Each cutter performs cutting by rubbing two rotary blades together up and down. The upper rotary blades 741 to 747 are supported on the rotation shaft 710. Lower rotary blades 751 to 757 are supported on the rotation shaft 711. The lower rotary blades 752 to 756 have cutting blades on both sides in the axial direction. For example, in the rotary blade 752, two cutting blades 7521 and 7522 are installed back to back while a clearance 739 corresponding to the thickness of the upper rotary blade 742 is provided therebetween. A waste dropping element (not shown) having a pointed tip is installed in the clearance 739. The other rotary blades 753 to 756 are the same as the rotary blade 752. The rotation shafts 710 and 711 are installed to span inside the case 730. The ends of the rotation shafts 710 and 711 on the side of the side plate 703 protrude to the outside of the case 730, and have gears 761 and 762 at their tips. The two gears 761 and 762 are coupled together, whereby the two rotation shafts 710 and 711 rotate reversely at the same time. The end of the rotation shaft 711 on the side of the side plate 702 protrudes to the outside of the case 730 and further protrudes to the outside of the side plate 702, and has a gear 763 at its tip. The other configurations are the same as those of the unit 70A.

Furthermore, when the unit 70C is accommodated in the unit accommodating part 9A in the optional processing device part 7, the gear 7051 is coupled with the gear 941 and the gear 763 is coupled with the gear 961.

Figure 21:
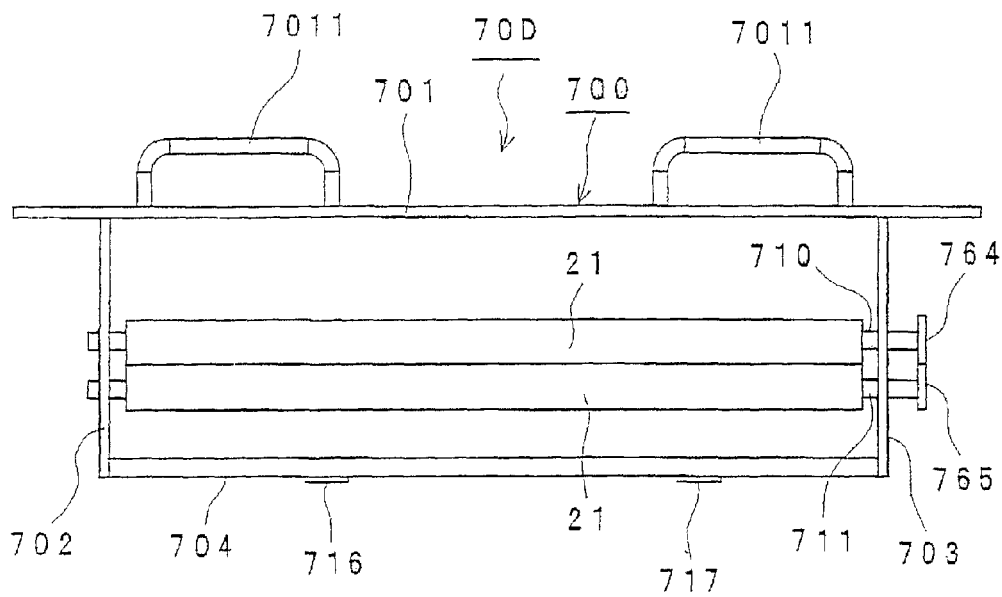
FIG. 21 is a front view showing a carrying unit.

FIG. 21 is a front view showing the carrying unit 70D. The unit 70D has a pair of rollers 21 inside a case part 700. The upper roller 21 is supported on a rotation shaft 710, and the lower roller 21 is supported on a rotation shaft 711. The ends of the rotation shafts 710 and 711 on the side of the side plate 703 protrude to the outside of the side plate 703 and have gears 764 and 765 at their tips. The two gears 764 and 765 are coupled together, whereby the two rotation shafts 710 and 711 rotate reversely at the same time. The other configurations are the same as those of the unit 70A.

Furthermore, when the unit 70D is accommodated in the unit accommodating part 9A in the optional processing device part 7, the gear 765 is coupled with the gear 971.

The two light-shielding plates (processing type detecting means) 716 and 717 installed in each unit are intended to detect the type of the unit by the optical sensors 981 and 982 of the unit accommodating part 9A, and can indicate four types of units according to the combination of the presence or absence of the light-shielding performance in the two light-shielding plates 716 and 717. The combination of the presence or absence of the light—shielding performance can be set as follows: for example, [presence, presence], [presence, absence], [absence, presence] and [absence, absence] in the order of the units 70A, 70B, 70C and 70D.

Next, the operation of the optional processing device part 7 will be described.

For example, in the case that perforations are desired to be formed in the optional processing device part 7, the perforation forming unit 70A is accommodated in the unit accommodating part 9A. When the unit 70A is accommodated in the unit accommodating part 9A, the gear 7051 is coupled with the gear 941, and the gear 7111 is coupled with the gear 971 as shown in FIG. 16. Furthermore, the optical sensors 981 and 982 detect that the unit accommodated is the unit 70A on the basis of the presence or absence of the light-shielding performance in the light-shielding plates 716 and 717. The detection signal is transmitted to the control means 800.

The unit 70A is ON-controlled by the processing control means of the control means 800, and is controlled by the position control means of the control means 800 so that the perforation forming tool 71 is positioned at the perforation forming position. In other words, by the position control means, the motor 942 of the first driving part 94 is operated for a predetermined time period, and the perforation forming tool 71 is moved to the perforation forming position. Furthermore, by the processing control means, the motor 972 of the fourth driving part 97 is operated, the receiving blade 713 and the gear blade 712 are rotated, and perforations are formed in the paper sheet 100 at the position of the perforation forming tool 71 in the carrying direction.

Figure 22:
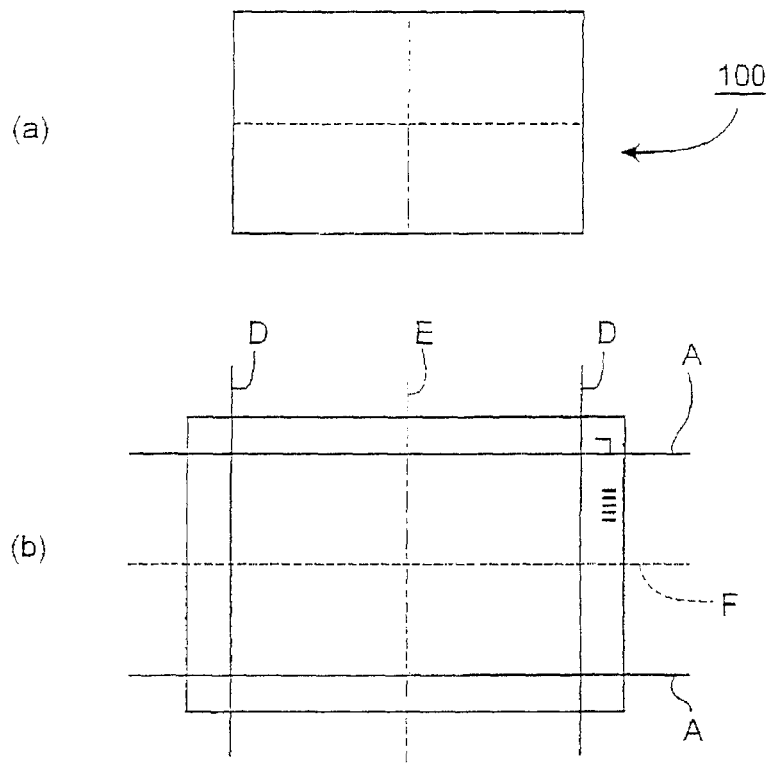
In FIG. 22, (a) is a view showing a paper sheet to be obtained by using the perforation forming unit, (b) is a view illustrating the content of the processing for obtaining the paper sheet.

In some cases, the optional processing device part 7 is operated while the first cutting device part 4A, the second cutting device part 4B, the third cutting device part 4C, the cutting waste dropping means 807, the fourth cutting device part 4D and the fold forming device part 5 are all operated; however, there is a different case. For example, in the case that the paper sheet 100 having the shape shown in (a) in FIG. 22 is desired to be obtained, the processing shown in (b) in FIG. 22 should only be performed by operating the first cutting device part 4A, the fourth cutting device part 4D, the fold forming device part 5 and further the unit 70A by the control means 800. In other words, the cutting along the solid lines A is performed by the first cutting device part 4A, the cutting along the solid lines D is performed by the fourth cutting device part 4D, the fold forming along the alternate long and short dash line E is performed by the fold forming device part 5, and the perforation forming along the broken line F is performed by the unit 70A.

In the case that cutting is desired to be performed in the optional processing device part 7, the cutting unit 70B is accommodated in the unit accommodating part 9A. When the unit 70B is accommodated in the unit accommodating part 9A, the gear 7051 is coupled with the gear 941, the gear 7111 is coupled with the gear 971, and the gear 7191 is coupled with the gear 951. Furthermore, the optical sensors 981 and 982 detect that the unit accommodated is the unit 70D on the basis of the presence or absence of the light-shielding performance in the light-shielding plates 716 and 717. The detection signal is transmitted to the control means 800.

The unit 70B is ON-controlled by the processing control means of the control means 800, and is controlled by the position control means of the control means 800 so that the two cutting cutters 72 and 74 are positioned at the cutting positions. In other words, by the position control means, the motor 942 of the first driving part 94 is operated for a predetermined time period, and the cutting cutter 72 is moved to its cutting position, and, additionally, the motor 952 of the second driving part 95 is operated for a predetermined time period, and the cutting cutter 74 is moved to its cutting position. Furthermore, by the processing control means, the motor 972 of the fourth driving part 97 is operated, the rotary blades of the cutting cutters 72 and 74 are rotated, and the paper sheet 100 is cut at the positions of the cutting cutters 72 and 74 in the carrying direction.

Figure 23:
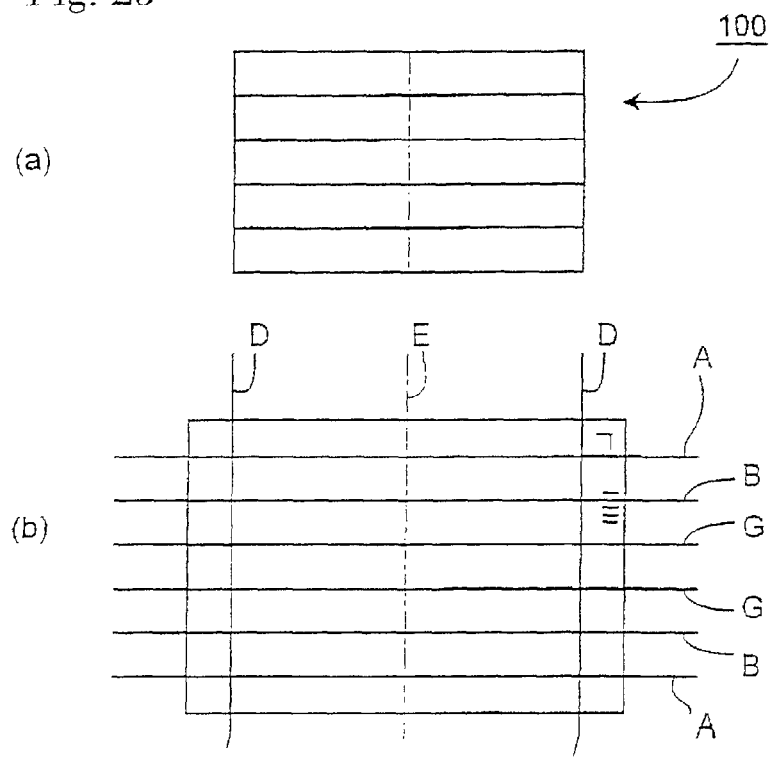
In FIG. 23, (a) is a view showing a paper sheet to be obtained by using the cutting unit, and (h) is a view illustrating the content of the processing for obtaining the paper sheet.

For example, in the case that the paper sheet 100 having the shape shown in (a) in FIG. 23 is desired to be obtained, the processing shown in (b) in FIG. 23 should only be performed by operating the first cutting device part 4A, the second cutting device part 4B, the fourth cutting device part 4D, the fold forming device part 5 and further the unit 70B by the control means 800. In other words, the cutting along the solid lines A is performed by the first cutting device part 4A, the cutting along the solid lines B is performed by the second cutting device part 4B, the cutting along the solid lines D is performed by the fourth cutting device part 4D, the fold forming along the alternate long and short dash line E is performed by the fold forming device part 5, and the cutting along the solid lines C is performed by the unit 70B.

In the case that business cards are desired to be formed in the optional processing device part 7, the business-card-only unit 70C is accommodated in the unit accommodating part 9A. When the unit 70C is accommodated in the unit accommodating part 9A, the gear 7051 is coupled with the gear 941, and the gear 763 is coupled with the gear 961. Furthermore, the optical sensors 981 and 982 detect that the unit accommodated is the unit 70C on the basis of the presence or absence of the light-shielding performance in the light-shielding plates 716 and 717. The detection signal is transmitted to the control means 800.

The unit 70C is ON-controlled by the processing control means of the control means 800, and is controlled by the position control means of the control means 800 so that the business card cutting tool 73 is positioned at the cutting position. In other words, by the position control means, the motor 942 of the first driving part 94 is operated for a predetermined time period, and all the cutters 731 to 737 of the business card cutting tool 73 are moved together with the case 730 to the cutting positions. Furthermore, by the processing control means, the motor 962 of the third driving part 96 is operated, the rotary blades of the cutters 731 to 737 are rotated, and the paper sheet 100 is cut in the carrying direction.

Figure 24:
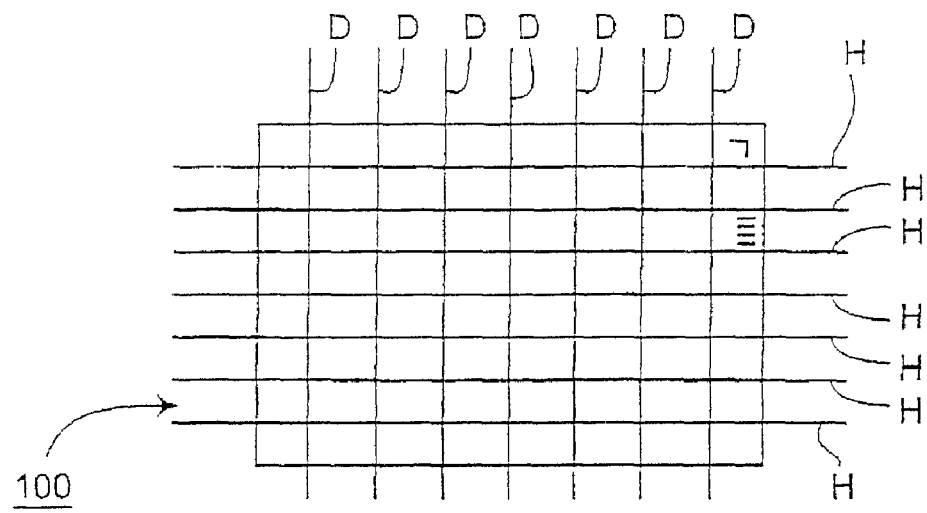
FIG. 24 is a view illustrating the content of the processing performed by the business-card-only unit.

In the case that the unit 70C is used in the optional processing device part 7, the processing shown in FIG. 24 should only be performed by operating the fourth cutting device part 4D and further the unit 70C by the control means 800. In other words, the cutting along the solid lines D is performed by the fourth cutting device part 4D, and the cutting along the solid lines H is performed by the unit 70C.

In the case that no particular processing is desired in the optional processing device part 7, the carrying unit 70D is accommodated in the unit accommodating part 9A. When the unit 70D is accommodated in the unit accommodating part 9A, the gear 765 is coupled with the gear 971. Furthermore, the optical sensors 981 and 982 detect that the unit accommodated is the unit 70D on the basis of the presence or absence of the light-shielding performance in the light-shielding plates 716 and 717. The detection signal is transmitted to the control means 800.

The unit 70D is ON-controlled by the processing control means of the control means 800. In other words, by the processing control means, the motor 972 of the fourth driving part 97 is operated, thereby rotating the pair of rollers 21. Hence, the paper sheet 100 being carried to the preceding stage is fed to the paper ejection part 12 without being processed.

As described above, in the paper sheet processing device 1 having the configuration described above, in addition to the processing by using the first cutting device part 4A, the second cutting device part 4B, the third cutting device part 4C, the fourth cutting device part 4D and the fold forming device part 5, the four types of processing means, that is, the units 70A to 70D, are prepared as the optional processing device part 7; hence, it is possible to meet the needs for special paper sheet processing by selectively using the processing means of the units 70A to 70D. In addition, since the optional processing device part 7 occupies only the space for one processing means, the device is not upsized.

Furthermore, the following configurations may also be adopted as modified embodiments.

(1) In the embodiment described above, the position mark 102 and the bar code 103 printed on the paper sheet 100 are read, and the device itself automatically performs the movement control of the positions of the processing means, such as the cutting cutters, on the basis of the information having been read; however, the paper sheet processing device in accordance with this embodiment is not limited to have this kind of configuration; for example, an embodiment described below can also be adopted. That is to say, the content of processing (the dimensions of paper sheets, the type of processing, etc.) and processing positions are input from an operation panel (not shown) and preset as processing forms. At the time of processing, a processing form being set is selected. Hence, the movement control of the positions of the processing means is performed, and paper sheet processing corresponding to the selected processing form is done.

(2) The position at which the optional processing device part 7 is installed is not limited to the last position of the carrying route 20, but the position may be any position within the carrying route 20.

(3) It may also possible that general processing means are decreased and that two or more optional processing device parts 7 are installed.

(4) The processing means being prepared as the optional processing device part 7 are not limited to the four types of processing means, that is, the units 70A to 70D described above, but other processing means may also be used.

For example, a fold forming unit for forming folds in the carrying direction may also be prepared. The fold forming unit is configured by replacing the cutting cutter of the cutting unit 70B with a fold forming tool. As the fold forming tool, the tool shown in FIG. 8 and FIG. 9 serving as a view taken in the direction of arrow IX of FIG. 8 in accordance with the first embodiment can be used.

In addition, a cutting unit for cutting paper sheets in the direction perpendicular to the carrying direction of the paper sheets or a fold forming unit for forming folds on paper sheets in the direction perpendicular to the carrying direction of the paper sheets may also be prepared.

(5) In the case that five or more types of processing means to be prepared as the optional processing device part 7 are available, the number of the optical sensors to be installed in the unit accommodating part 9A and the number of the light-shielding plates to be installed in the processing unit should be three or more to increase the number of the combination of the presence or absence of the light-shielding performance.

(6) As in the case of the cutting cutters 72 and 74 of the cutting unit 70B, two perforation forming tools may be installed in the perforation forming unit 70A.

(7) As in the case of the perforation forming tool 71 of the cutting unit 70A, the number of the cutting cutter of the cutting unit 70B may be one.

(8) The processing means and the like to be installed ahead of the optional processing device part 7 are not limited to the embodiments described above.

(9) The first, second and third cutting device parts 4A, 4B and 4C may be configured so as to be detachable from the device body 10, but they may also be configured so as not to be detachable.

Third Embodiment

Figure 25:
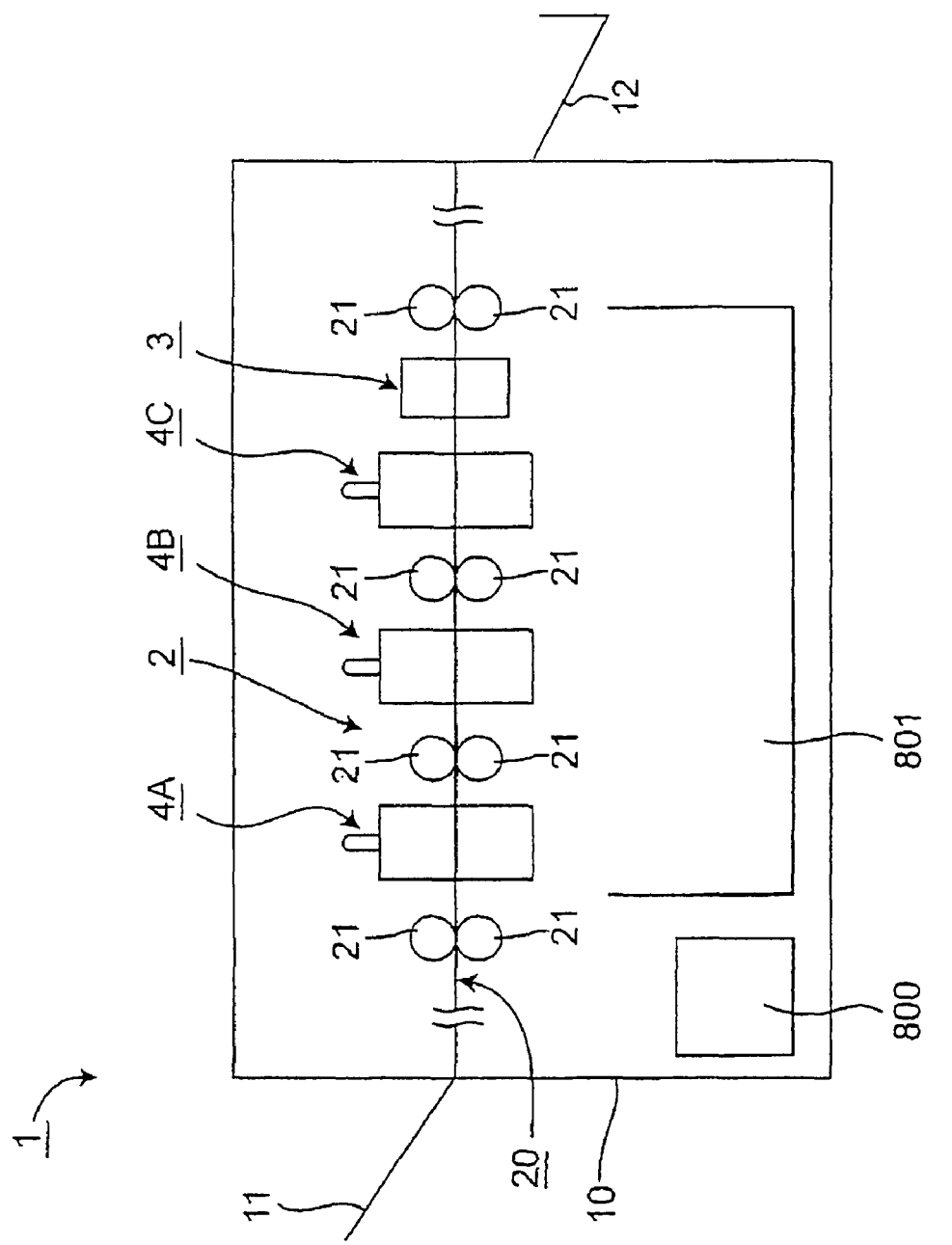
FIG. 25 is a schematic vertical sectional view showing the whole of a paper sheet processing device in accordance with a third embodiment of the present invention.

FIG. 25 is a schematic vertical sectional view showing the whole of a paper sheet processing device in accordance with a third embodiment of the present invention. A paper sheet processing device 1 is provided with a paper feeding part 11 comprised of a paper feeding tray and a paper ejection part 12 comprised of a paper ejection tray on both ends of the device body 10 thereof. A carrying route 20 is formed of carrier means 2 comprising multiple pairs of rollers 21 in the range from the paper feeding part 11 to the paper ejection part 12. In addition, at least a first cutting device part 4A, a second cutting device part 4B, a third cutting device part 4C and a cutting waste elimination device part 3 are installed on the carrying route 20 from the side of the paper feeding part 11. These are all supported on the device body 10. Furthermore, processing driving means (not shown) are connected to these means. The first cutting device part 4A, the second cutting device part 4B and the third cutting device part 4C respectively corresponds to the first type processing device part.

Besides, the paper sheet processing device 1 is provided with a control means 800 for controlling the operation of the whole device inside the device body 10. The control means 800 has a CPU connected to an operation panel (not shown). The control means 800 also performs control, for example, as a movement control means described later. Moreover, the paper sheet processing device 1 has a trash box 801 for accommodating cutting waste generated by cutting paper sheets at the bottom part inside the device body 10.

Figure 26:
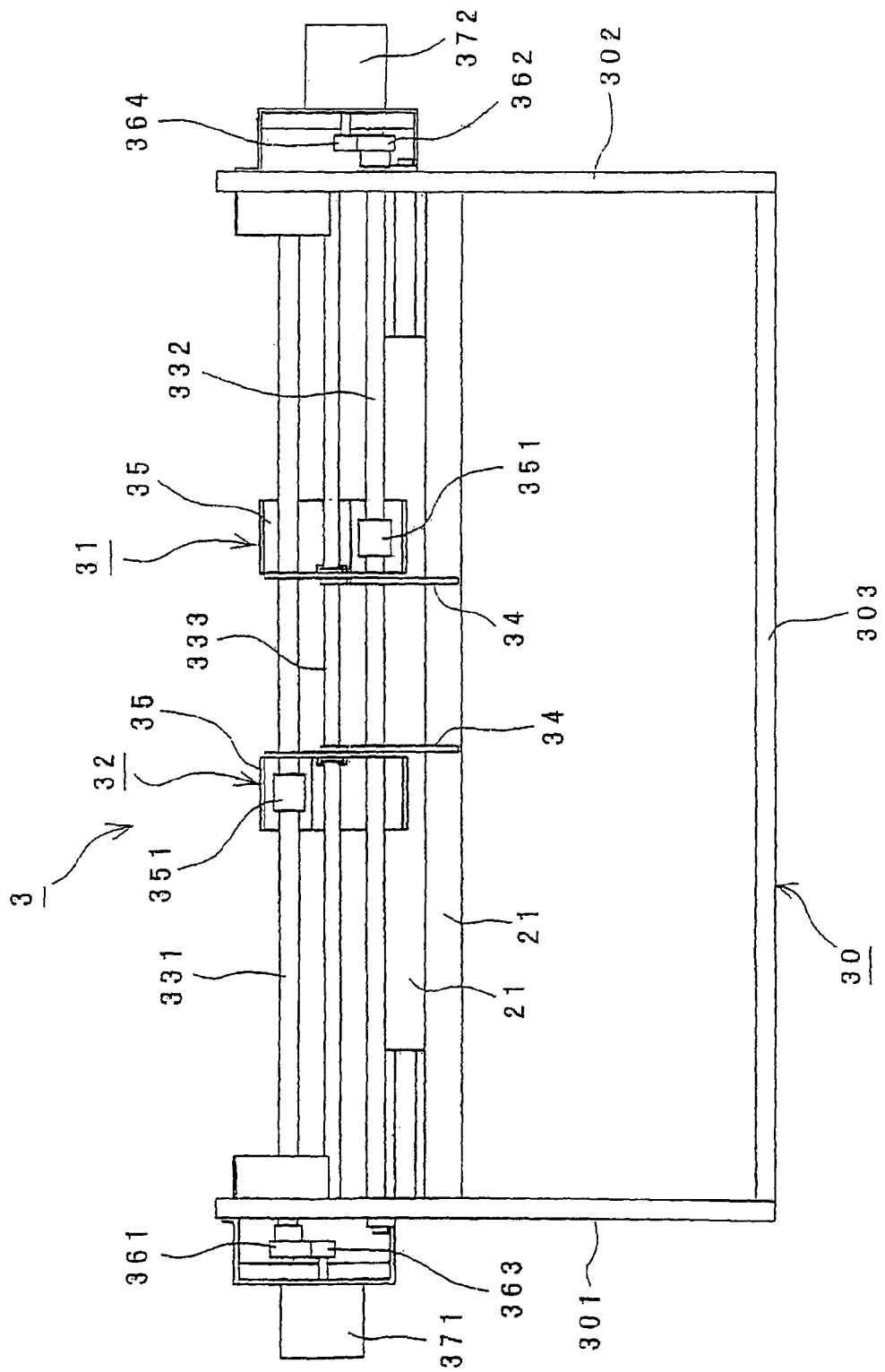
FIG. 26 is a front view showing the cutting waste elimination device part of the paper sheet processing device in accordance with the third embodiment.
Figure 27:
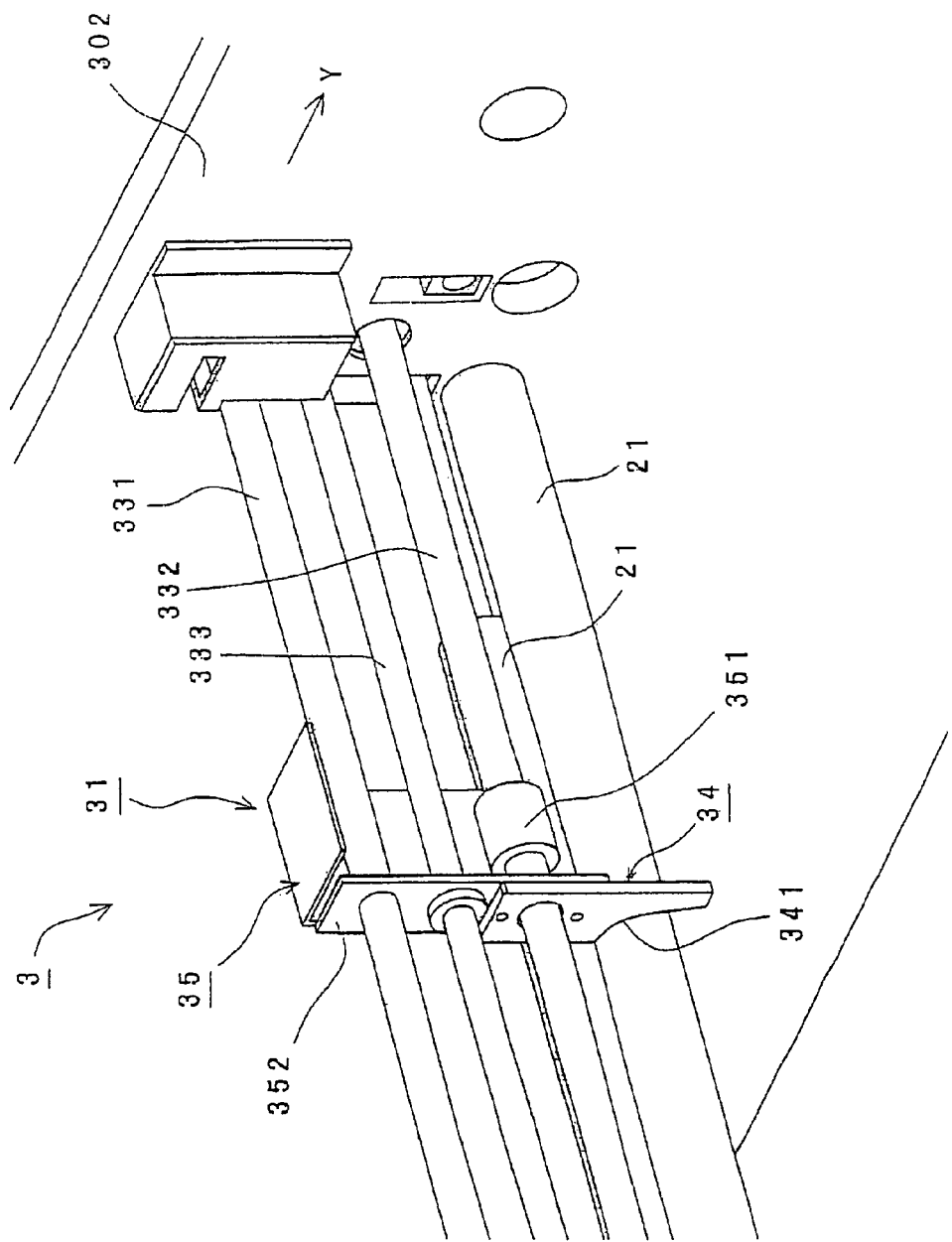
FIG. 27 is a fragmentary perspective view of FIG. 26.

FIG. 26 is a front view showing the cutting waste elimination device part 3, and FIG. 27 is a fragmentary perspective view of FIG. 26. The arrow Y in FIG. 27 indicates the carrying direction. The cutting waste elimination device part 3 is provided with a case part 30 and two cutting waste elimination means 31 and 32. The case part 30 comprises two side plates 301 and 302 and a bottom frame 303. The two cutting waste elimination means 31 and 32 are supported inside the case part 30. Two screw shafts (moving means) 331 and 332, one guide shaft 333 and a pair or rollers 21 are installed to span between the side plates 301 and 302.

The cutting waste elimination means 31 comprises a guide member 34 and a support member 35. The guide member 34 is installed so as to cross the carrying route 20 vertically and has a curved part 341 opposed to the leading ends of cutting waste being carried. The carrying route 20 is configured at the height position between the pair of rollers 21. The curved part 341 is curved so as to turn the direction of the leading ends of cutting waste making contact therewith downward and extends from slightly above the carrying route 20 to below the carrying route 20. The support member 35 is connected to the guide member 34 so as to be integrated. In addition, as the screw shaft 332 is rotated, the cutting waste elimination means 31 can move along the guide shaft 333. The screw shaft 332 passes through the screw engagement part 351 of the support member 35. The guide shaft 333 passes through the side wall 352 of the support member 35. The screw shaft 332 passes through the guide member 34 and the side wall 352 of the support member 35. Furthermore, the screw shaft 331 passes through the side wall 352 of the support member 35.

The cutting waste elimination means 32 has the same configuration as that of the cutting waste elimination means 31, but is installed so as to be symmetrical with the cutting waste elimination means 31. As the screw shaft 331 is rotated, the cutting waste elimination means 32 can move along the guide shaft 333. The screw shaft 331 passes through the screw engagement part 351 of the support member 35. The guide shaft 333 passes through the side wall 352 of the support member 35. The screw shaft 331 passes through the side wall 352 of the support member 35. Furthermore, the screw shaft 332 passes through the guide member 34 and the side wall 352 of the support member 35.

In the cutting waste elimination device part 3, a gear 361 is installed at the end of the screw shaft 331 protruding from the side plate 301 to the outside; furthermore, a gear 362 is installed at the end of the screw shaft 332 protruding from the side plate 302 to the outside. A motor 371 is installed on the outer upper part of the side plate 301, and a motor 372 is installed on the outer upper part of the side plate 302. The motor 371 rotates the screw shaft 331 via a gear 363 and a gear 361. The motor 372 rotates the screw shaft 332 via a gear 364 and a gear 362.

The first cutting device part 4A comprises a cutting unit 70X and a unit accommodating part 9. The configurations and the operations of the cutting unit 70X and the unit accommodating part 9 are the same as those of the cutting unit 70X and the unit accommodating part 9 shown in FIGS. 4 to 6 in accordance with the first embodiment. The second cutting device part 4B and the third cutting device part 4C have the same configuration as that of the first cutting device part 4A.

Figure 28:
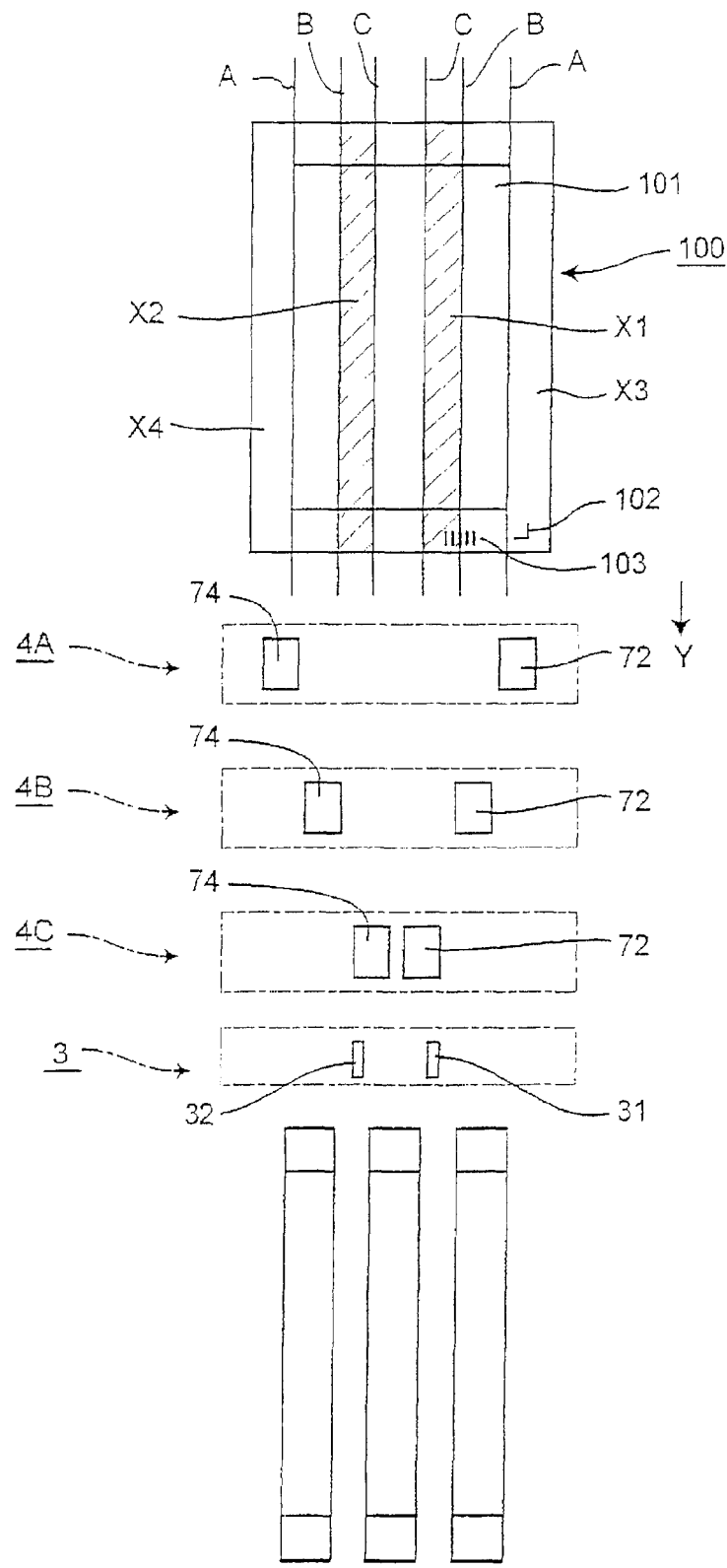
FIG. 28 is a schematic plan view showing an example of the processing content of a paper sheet.

Next, the operation of the paper sheet processing device 1 described above will be described referring to FIG. 28. FIG. 28 is a schematic plan view showing an example of the processing of the paper sheet 100. The arrow Y in FIG. 28 indicates the carrying direction. On the paper sheet 100, a position mark 102 and a bar code 103 are printed together with a main printed part 101.

First, paper sheets 100 are fed one by one from a bundle of the paper sheets 100 placed on the paper feeding part 11 to the carrying route 20. In addition, the paper sheets enter an information reading means (not shown). The information reading means reads the position mark 102 and the bar code 103 of the paper sheet 100 by a CCD sensor. This information having been read is sent to the control means 800. As the information reading means, the information reading means 804 in accordance with the first embodiment and the second embodiment can be used. The control means 800 stores the information having been read and controls the subsequent various means on the basis of it. The processing information indicated by the bar code 103 has the following content, for example. In other words, the content is to cut the paper sheet 100 along the solid lines A, B and C shown in FIG. 28 and then to eliminate cutting waste pieces X1 and X2 indicated by diagonal lines from the carrying route 20. In the case of such processing information, the subsequent various means operate as described below.

The paper sheet 100 having passed through the information reading means enters the first cutting device part 4A. The first cutting device part 4A wherein the unit 70X is accommodated in the unit accommodating part 9 operates as described below. In other words, the first cutting device part 4A is ON-controlled by the control means 800, and is controlled by the movement control means of the control means 800 so that two cutting cutters 72 and 74 are positioned at the cutting positions. More specifically, by the movement control means of the control means 800, the motor 942 of the first driving part 94 is operated for a predetermined time period, and the cutting cutter 72 is moved to the position indicated by one of the solid lines A, and, additionally, the motor 952 of the second driving part 95 is operated for a predetermined time period, and the cutting cutter 74 is moved to the position indicated by the other solid line A. Furthermore, by the control means 800, the motor 962 of the third driving part 96 is operated, the rotary blades of the cutting cutters 72 and 74 are rotated, and the paper sheet 100 is cut at the positions of the cutting cutters 72 and 74 in the carrying direction. Hence, the paper sheet 100 is cut along the solid lines A, that is, in the carrying direction, by the first cutting device part 4A and is carried to the second cutting device part 4B provided next. Unnecessary pieces X3 and X4 are dropped into the trash box 801.

The second cutting device part 4B is ON-controlled by the control means 800, and is controlled by the movement control means of the control means 800 so that two cutting cutters 72 and 74 are respectively positioned at the positions indicated by two solid lines B. Hence, the paper sheet 100 is cut along the solid lines B, that is, in the carrying direction, by the second cutting device part 4B and is carried to the third cutting device part 4C provided next.

The third cutting device part 4C is ON-controlled by the control means 800, and is controlled by the movement control means of the control means 800 so that two cutting cutters 72 and 74 are respectively positioned at the positions indicated by two solid lines C. Hence, the paper sheet 100 is cut along the solid lines C, that is, in the carrying direction, by the third cutting device part 4C and is carried to the cutting waste elimination device part 3.

Figure 29:
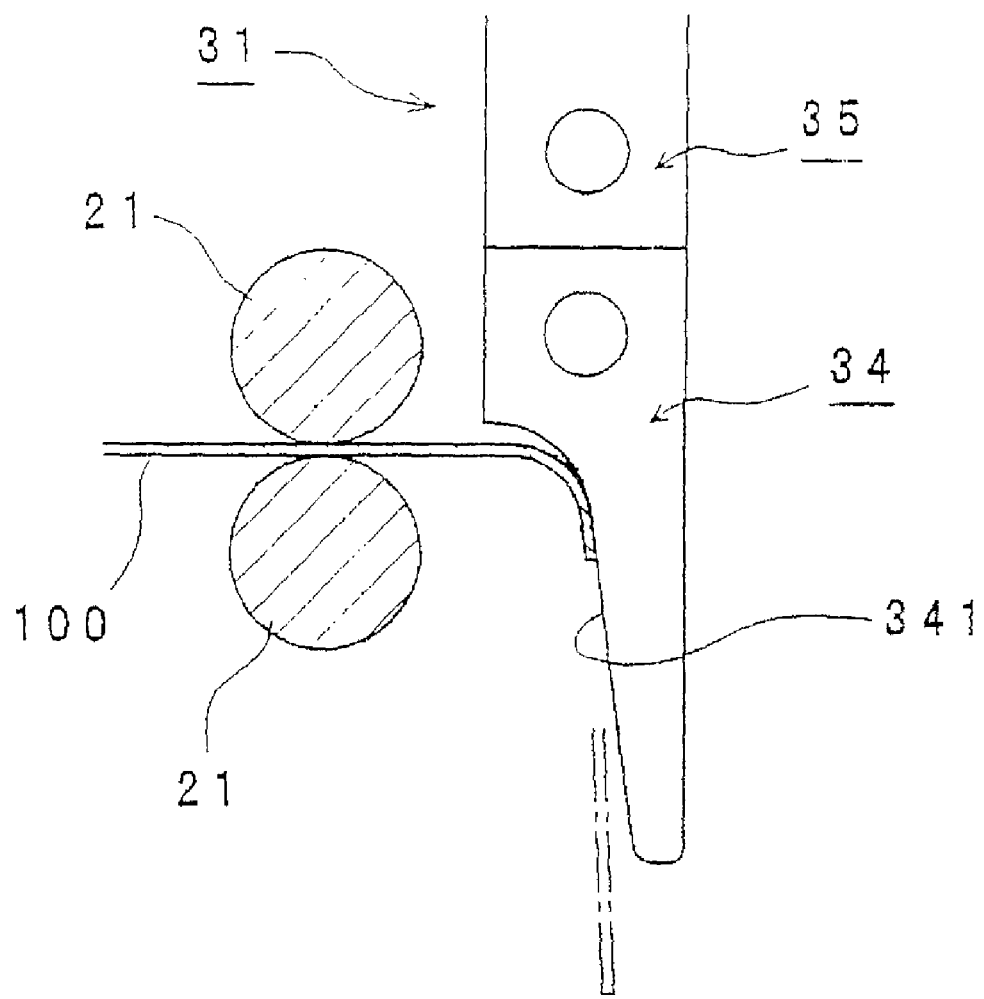
FIG. 29 is a side view showing the operation of a cutting waste elimination means.

The cutting waste elimination device part 3 operates as described below. In other words, the cutting waste elimination device part 3 is ON-controlled by the control means 800, and is controlled by the movement control means of the control means 800 so that two cutting waste ejection means 31 and 32 are positioned at cutting waste generation positions. More specifically, by the movement control means of the control means 800, the motor 372 is operated for a predetermined time period, and the guide member 34 of the cutting waste elimination means 31 is moved to the central position of the cutting waste piece X1 in the width direction thereof, and, additionally, the motor 371 is operated for a predetermined time period, and the guide member 34 of the cutting waste elimination means 32 is moved to the central position of the cutting waste piece X2 in the width direction thereof. Hence, while being carried, the cutting waste pieces X1 and X2, the leading ends of which make contact with the curved parts 341 of the cutting waste elimination means 31 and 32 and then turn downward as shown in FIG. 29, directly drop into the trash box 801. As a result, the cutting waste pieces X1 and X2 are eliminated from the carrying route 20 by the cutting waste elimination device part 3.

Figure 30:
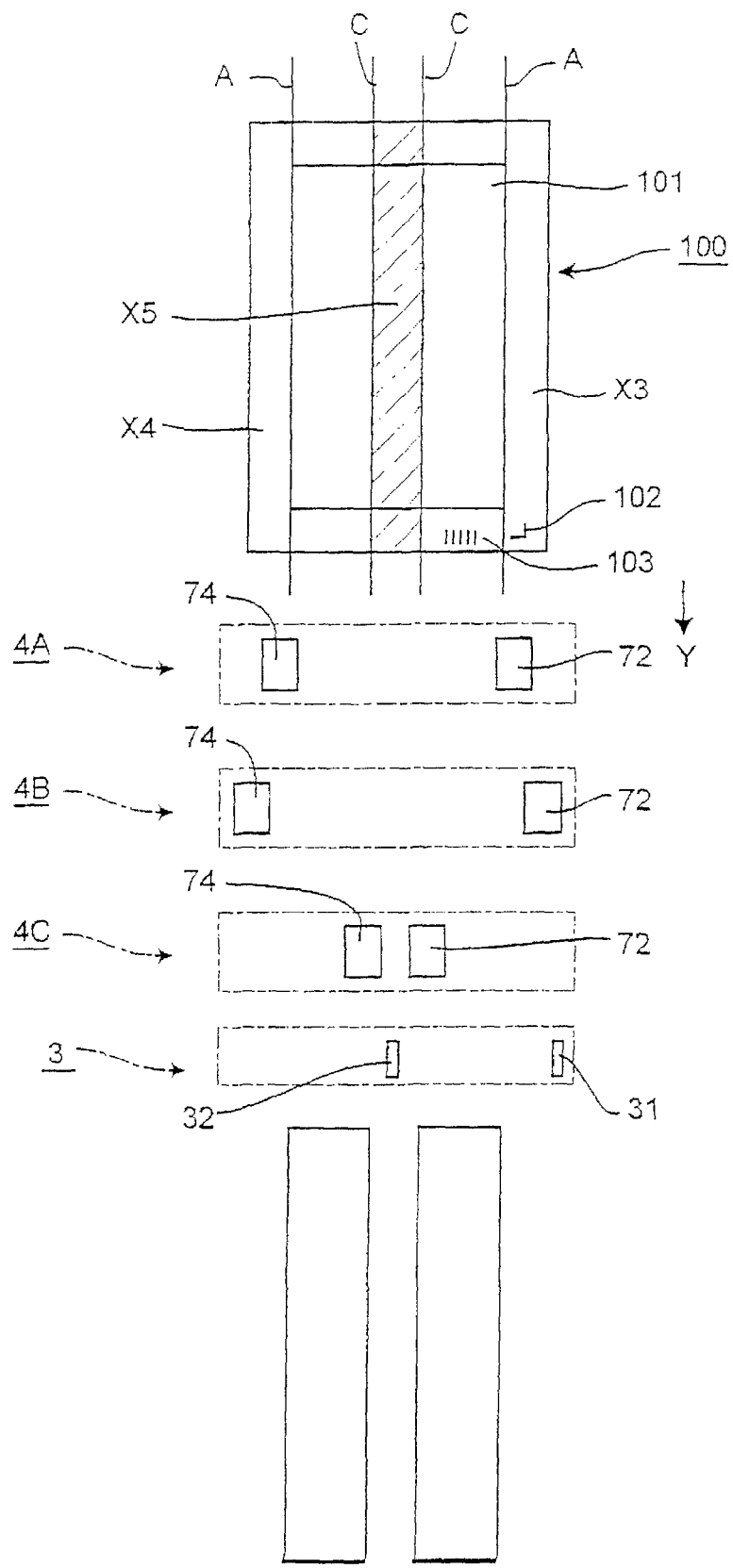
FIG. 30 is a schematic plan view showing another example of the processing content of a paper sheet.

FIG. 30 shows a case wherein the processing information for a paper sheet 100 is different from the example described above and shown in FIG. 28. The processing information is as described below. In other words, the paper sheet 100 is cut along the solid lines A and C, and then the cutting waste piece X5 indicated by diagonal lines is eliminated from the carrying route 20. In this case, the first, second and third cutting device parts 4A, 4B and 4C and the cutting waste elimination device part 3 operate as described below.

In other words, the first cutting device part 4A is ON-controlled by the control means 800, and is controlled by the movement control means of the control means 800 so that the two cutting cutters 72 and 74 are respectively positioned at the positions indicated by two solid lines A. Hence, the paper sheet 100 is cut along the solid lines A by the first cutting device part 4A and is carried to the second cutting device part 4B provided next. Unnecessary pieces X3 and X4 are dropped into the trash box 801.

In the second cutting device part 4B, the two cutting cutters 72 and 74 are respectively retracted to their home positions by the movement control means of the control means 800. In addition, the second cutting device part 4B is OFF-controlled by the control means 800. Hence, the paper sheet 100 is not cut by the second cutting device part 4B and is carried to the third cutting device part 4C provided next.

The third cutting device part 4C is ON-controlled by the control means 800, and is controlled by the movement control means of the control means 800 so that the two cutting cutters 72 and 74 are respectively positioned at the positions indicated by two solid lines C. Hence, the paper sheet 100 is cut along the solid lines C by the third cutting device part 4C and is carried to the cutting waste elimination device part 3.

The cutting waste elimination device part 3 is ON-controlled by the control means 800, and is controlled by the movement control means of the control means 800 so that one cutting waste elimination means 32 is positioned at the central position of the cutting waste piece X1 in the width direction thereof and the other cutting waste elimination means 31 is retracted to its home position. Hence, the cutting waste piece X1 is eliminated from the carrying route 20 by the cutting waste elimination device part 3. It may be possible that the cutting waste elimination means 31 is moved and that the cutting waste elimination means 32 is retracted.

As described above, in the paper sheet processing device 1 configured as described above, the cutting waste elimination means can be moved to the cutting waste generation positions; hence, cutting waste can be eliminated securely from the carrying route by the cutting waste elimination means, even in the case that the cutting waste generation positions are changed owing to the change of cutting positions.

In addition, in the paper sheet processing device 1 having the configuration described above, the cutting units for performing cutting in the first, second and third cutting device parts 4A, 4B and 4C, respectively, are installed detachably from the device body 10; hence, the following effects can be achieved. That is to say, even in the case that the cutting cutter of one of the cutting device parts, for example, the first cutting device part 4A, is required to be replaced because of abrasion or the like, replacement can be performed simply by taking the cutting unit 70X from the unit accommodating part 9 of the device body 10 and by accommodating a new cutting unit 70X being prepared as a spare in the unit accommodating part 9. Hence, time and effort required for replacement work can be reduced.

Furthermore, the following configurations may also be adopted as modified embodiments.

(1) In the example described above, the judgment as to which of the paper pieces fed from the cutting device part are cutting waste pieces is performed on the basis of the processing information based on the bar code 103 printed on the paper sheet 100 beforehand; however, the judgment is not limited to this. For example, paper sheet pieces having a predetermined width (for example, 5 mm or more and 15 mm or less) may be judged as cutting waste by detecting the width of each paper sheet piece at the time when paper sheet pieces having passed through the cutting device parts enter the cutting waste elimination device part. In other words, the judgment as to whether paper pieces are cutting waste or not may be performed on the basis of the widths of paper pieces obtained after the cutting. In this case, a width sensor is installed at the preceding stage of the cutting waste elimination device part, for example.

(2) The processing information for paper sheets may be input beforehand from an operation panel (not shown).

(3) The position at which the cutting waste elimination means is installed is not limited at the last position of the carrying route 20, but may be in the middle.

(4) Multiple cutting waste elimination means may be installed along the carrying route 20.

(5) In the paper sheet processing device 1 having the configuration described above, the first, second and third cutting device parts 4A, 4B and 4C are configured so as to be detachable from the device body 10, but they may also be configured so as not to be detachable.

(6) The optional processing device part 7 in accordance with the second embodiment may also be installed.

Fourth Embodiment

Figure 31:
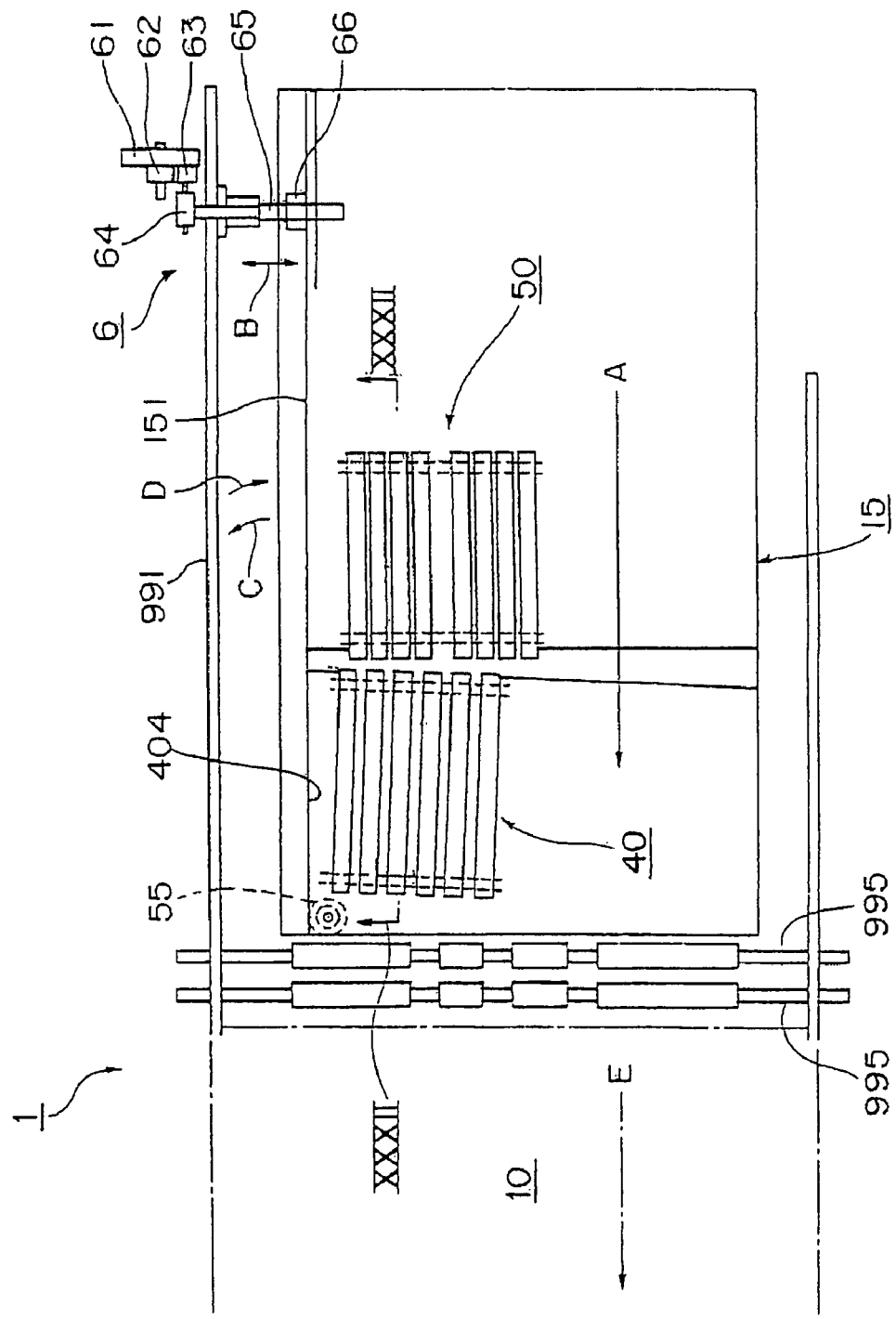
FIG. 31 is a schematic plan view showing a paper feeding device being used for a paper sheet processing device in accordance with a fourth embodiment of the present invention.

FIG. 31 is a schematic plan view showing a paper feeding device part being used for a paper sheet processing device 1 in accordance with a fourth embodiment of the present invention. A paper feeding device part 15 is installed on the upstream side of the carrying direction in a device body 10 for processing paper sheets. Carrying rollers 995 are installed between them.

The paper feeding device part 15 comprises an integration of an adsorption carrier means 50 positioned on the upstream side of the carrying direction (the direction of arrow A) and an oblique carrier means 40 positioned on the downstream side, and has an external appearance of a rectangle in the plan view.

Figure 32:
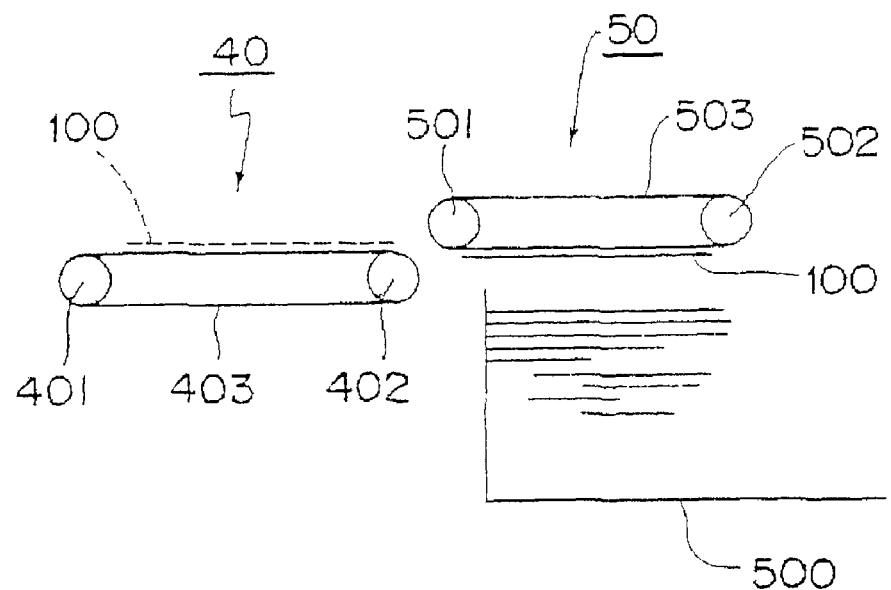
FIG. 32 is a schematic sectional view taken on line XXXII-XXXII of FIG. 31.

FIG. 32 is a schematic sectional view taken on line XXXII-XXXII of FIG. 31. The adsorption carrier means 50 adsorbs and carries the paper sheets placed on a paper sheet holder 500 one by one by an endless belt 503. The endless belt 503 is stretched around a pair of rollers 501 and 502. The paper sheets 100 are adsorbed one by one to the endless belt 503 by a suction means (not shown). The endless belt 503 is installed in parallel with the carrying direction.

The oblique carrier means 40 places the paper sheet 100 having been carried by the adsorption carrier means 50 on an endless belt 403 and carries it. The endless belt 403 is stretched around a pair of rollers 401 and 402. The endless belt 403 is installed so as to be inclined slightly toward a guide wall 404 with respect to the carrying direction. Hence, in the oblique carrier means 40, the paper sheet 100 is carried while being pushed toward the guide wall 404, whereby carrying is performed in the direction of the arrow A while the fringe 111 of the paper sheet 100 is in a state of being aligned along the guide wall 404.

In addition, the paper feeding device part 15 in accordance with this embodiment has a rotation mechanism with respect to the device body 10. The rotation mechanism comprises a vertical rotation shaft (vertical shaft) 55 and an adjustment mechanism 6.

The rotation shaft 55 is installed at a corner of the paper feeding device part 15 having the shape of a rectangle in the plan view on the downstream side of the carrying direction and on the base (not shown) of the device body 10.

The adjustment mechanism 6 comprises a dial 61, a pair of pulleys 62 and 63, a worm wheel 64, a lead screw 65 and a nut member 66. The dial 61, the pair of pulleys 62 and 63, the worm wheel 64 and the lead screw 65 are secured to the side frame 991 of the device body 10. The worm wheel 64 is engaged with a worm (not shown) coaxially connected to the pulley 63. The lead screw 65 is coaxially connected to the worm wheel 64. The nut member 66 is installed on the side frame 151 of the paper feeding device part 15. Furthermore, an endless belt (not shown) is stretched between the pulleys 62 and 63. The dial 61 is disposed so that it can be rotated manually. The pulleys 62 and 63 and the worm wheel 64 are configured to rotate in conjunction with the dial 61. The lead screw 65 extends from the worm wheel 64 while passing through the side frame 991, the nut member 66 and the side frame 151.

Figure 33:
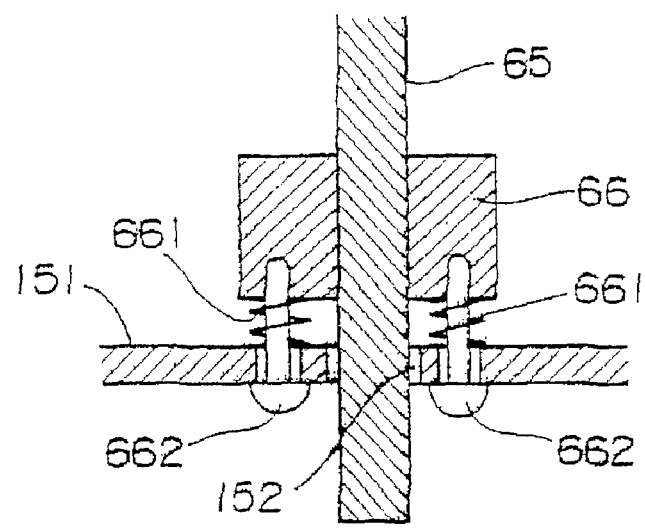
FIG. 33 is a fragmentary magnified sectional view showing an adjustment mechanism in accordance with the fourth embodiment.

FIG. 33 is a fragmentary magnified sectional view showing the adjustment mechanism 6. In the adjustment mechanism 6, the through hole 152 of the side frame 151 is set so as to be larger than the diameter of the lead screw 65. The lead screw 65 passes through the nut member 66 while being engaged therewith. The nut member 66 is secured to the side frame 151 by means of bolts 662 via springs 661. Since the bolts 662 have play with respect to the side frame 151, the nut member 66 is in a floating state with respect to the side frame 151. Hence, the lead screw 65 and the nut member 66 can incline from the state of being perpendicular to the side frame 151. Furthermore, as the lead screw 65 rotates, the nut member 66 moves relatively with respect to the lead screw 65 in the direction of arrow B, thereby moves together with the side frame 151, that is, the paper feeding device part 15, at that time.

In the paper feeding device part 15 configured as described above, when the dial 61 of the adjustment mechanism 6 is rotated, the pair of pulleys 62 and 63 and the worm wheel 64 are rotated, and the lead screw 65 is rotated, whereby the nut member 66 moves in the direction of the arrow B. However, since the rotation shaft 55 is installed in the paper feeding device part 15, when the nut member 66 moves toward the side frame 991, for example, the paper feeding device part 15 is rotated around the rotation shaft 55 in the direction of arrow C. On the other hand, when the dial 61 is rotated in the direction opposed to that described above to move the nut member 66 toward the side frame 151, the paper feeding device part 15 is rotated around the rotation shaft 55 in the direction of arrow D.

Hence, according to the paper feeding device part 15 configured as described above, the paper feeding device part 15 can be rotated around the rotation shaft 55 with respect to the device body 10 by rotating the dial 61. In other words, in the paper feeding device part 15 configured described above, the carrying direction (the direction of the arrow A) of the paper feeding device part 15 can be inclined with respect to the carrying direction (the direction of arrow E) of the device body 10.

Figure 34:
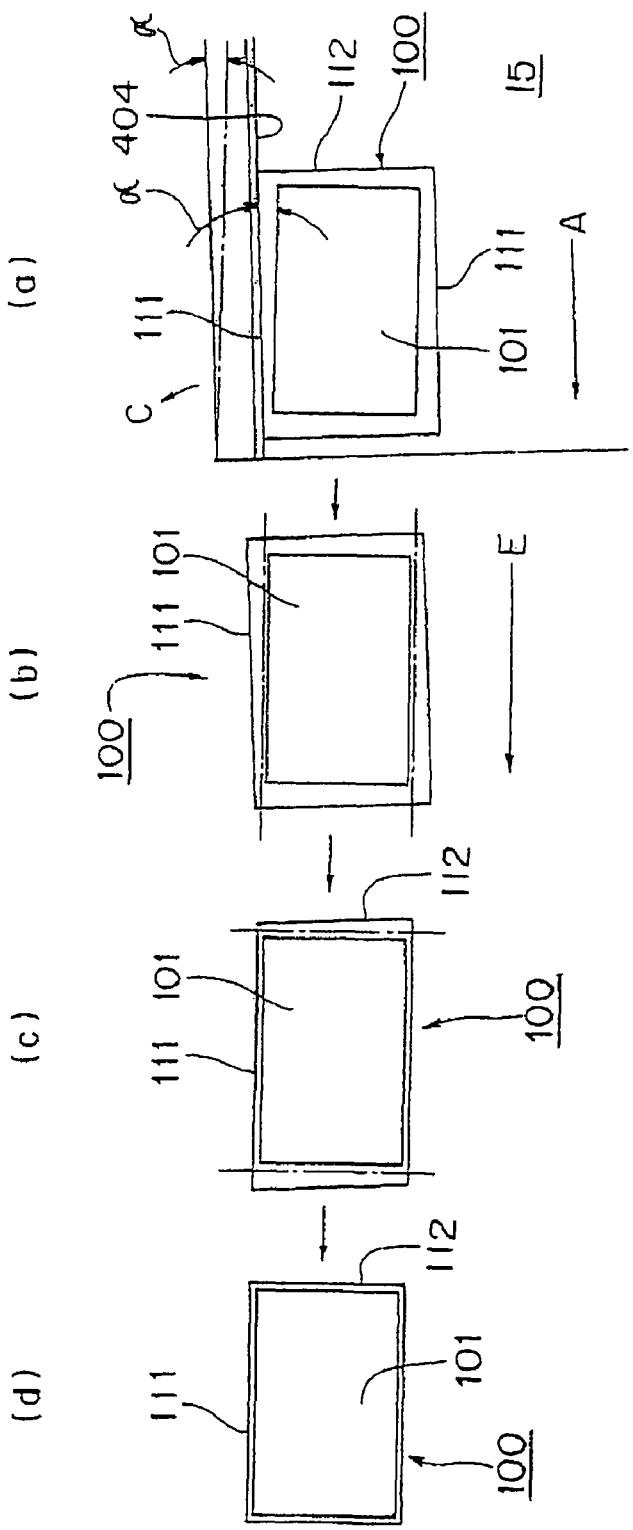
FIG. 34 is a schematic plan view showing a step of cutting a paper sheet in the paper sheet processing device in accordance with the fourth embodiment.

In the paper sheet processing device 1 provided with the paper feeding device part 15 configured as described above, a paper sheet 100 having a printed area 101 inclined by angle α with respect to the fringe 111 thereof is fed and processed as shown in FIG. 34. In other words, in FIG. 34, first, as shown in (a), the paper feeding device part 15 is rotated by angle α in the direction of the arrow C. Then, the paper sheet 100 is carried by the adsorption carrier means 50 and the oblique carrier means 40. In the oblique carrier means 40, carrying is performed while the fringe 111 of the paper sheet 100 is in a state of being aligned along the guide wall 404. At this time, since the angle α between the printed area 101 and the fringe 111 of the paper sheet 100 is the same as the rotation angle α of the paper feeding device part 15, the printed area 101 is in parallel with the carrying direction (the direction of the arrow E) of the device body 10 as shown in (a), in the case of the paper sheet 100, the fringe 111 of which is in a state of being aligned along the guide wall 404. Then, the paper sheet 100 is fed to the device body 10 while being maintained in the same state. Hence, the cutting in the carrying direction is performed in parallel with the printed area 101 as indicated by the alternate long and short dash lines shown in (b). Therefore, as shown in (c), a paper sheet 100, the printed area 101 of which is in parallel with the fringe 111 thereof, is obtained. Furthermore, the cutting in the direction perpendicular to the carrying direction is performed in parallel with the printed area 101 as indicated by the alternate long and short dash lines shown in (c). As a result, as shown in (d), a paper sheet 100, the printed area 101 of which is in parallel with the fringes 111 and 112 thereof, is obtained.

Consequently, according to the paper sheet processing device configured as described above, by processing a paper sheet 100 having a printed area 101 inclined with respect to the fringe 111 thereof, it is possible to obtain a paper sheet 100 having the printed area 101 being in parallel with the fringe 111.

In this embodiment, the carrier means on the upstream side of the paper feeding device part 15 is not limited to the adsorption carrier means 50, but a roller feeding means and other known paper feeding means may also be used.

Moreover, the paper feeding device part 15 in accordance with this embodiment can be applied to the device body 10 of the paper sheet processing device 1 in accordance with the first to third embodiments.

Fifth Embodiment

Figure 35:
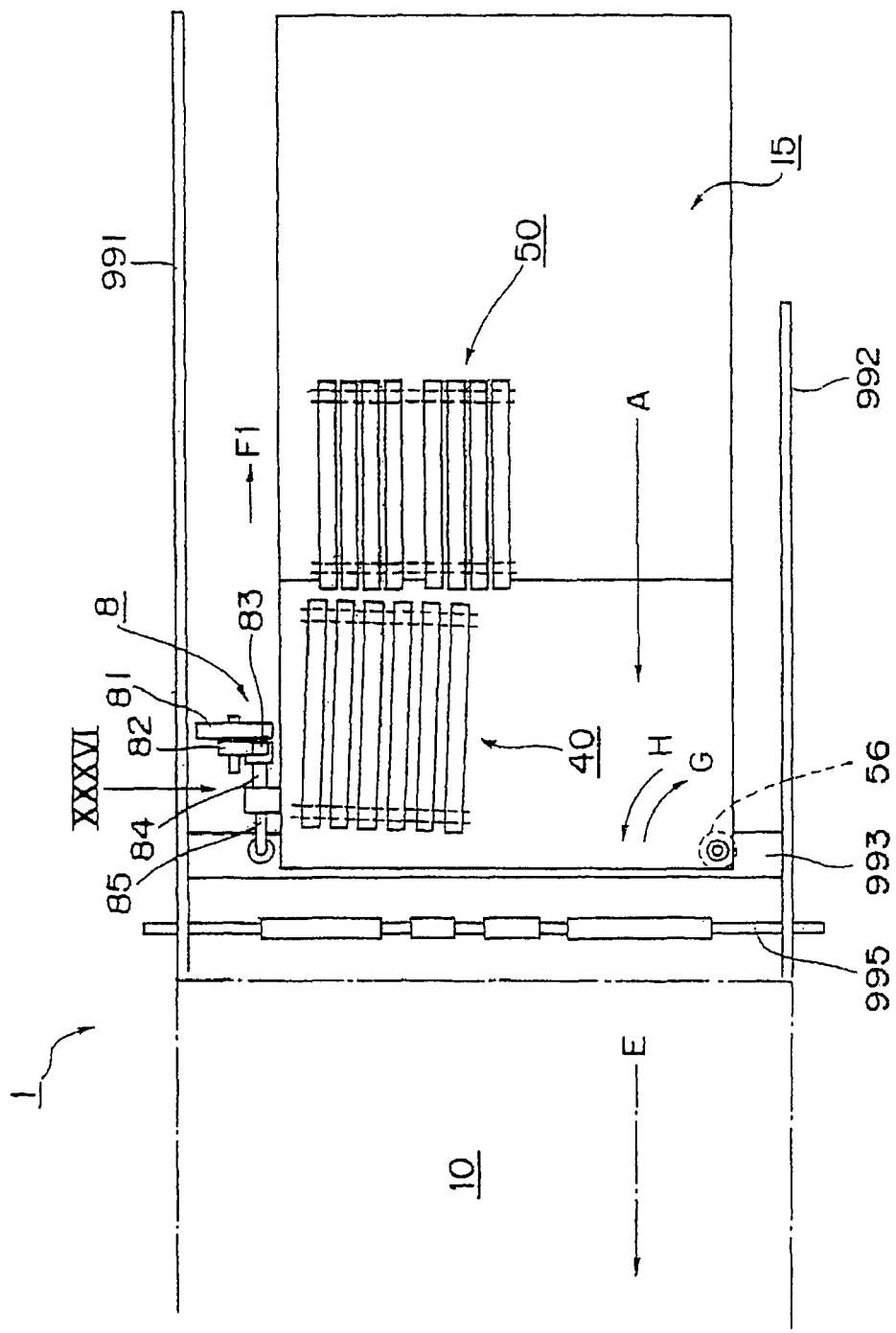
FIG. 35 is a schematic plan view showing a paper feeding device being used for a paper sheet processing device in accordance with a fifth embodiment of the present invention.

FIG. 35 is a schematic plan view showing a paper feeding device part being used for a paper sheet processing device 1 in accordance with a fifth embodiment of the present invention. This embodiment differs from the fourth embodiment only in the rotation mechanism of the paper feeding device part 15. The rotation mechanism in accordance with this embodiment comprises a vertical rotation shaft 56 and an adjustment mechanism 8.

The rotation shaft 56 is installed at a corner of the paper feeding device part 15 having the shape of a rectangle in the plan view on the downstream side of the carrying direction and on a base frame 993 spanned between both side frames 991 and 992 of the device body 10.

Figure 36:
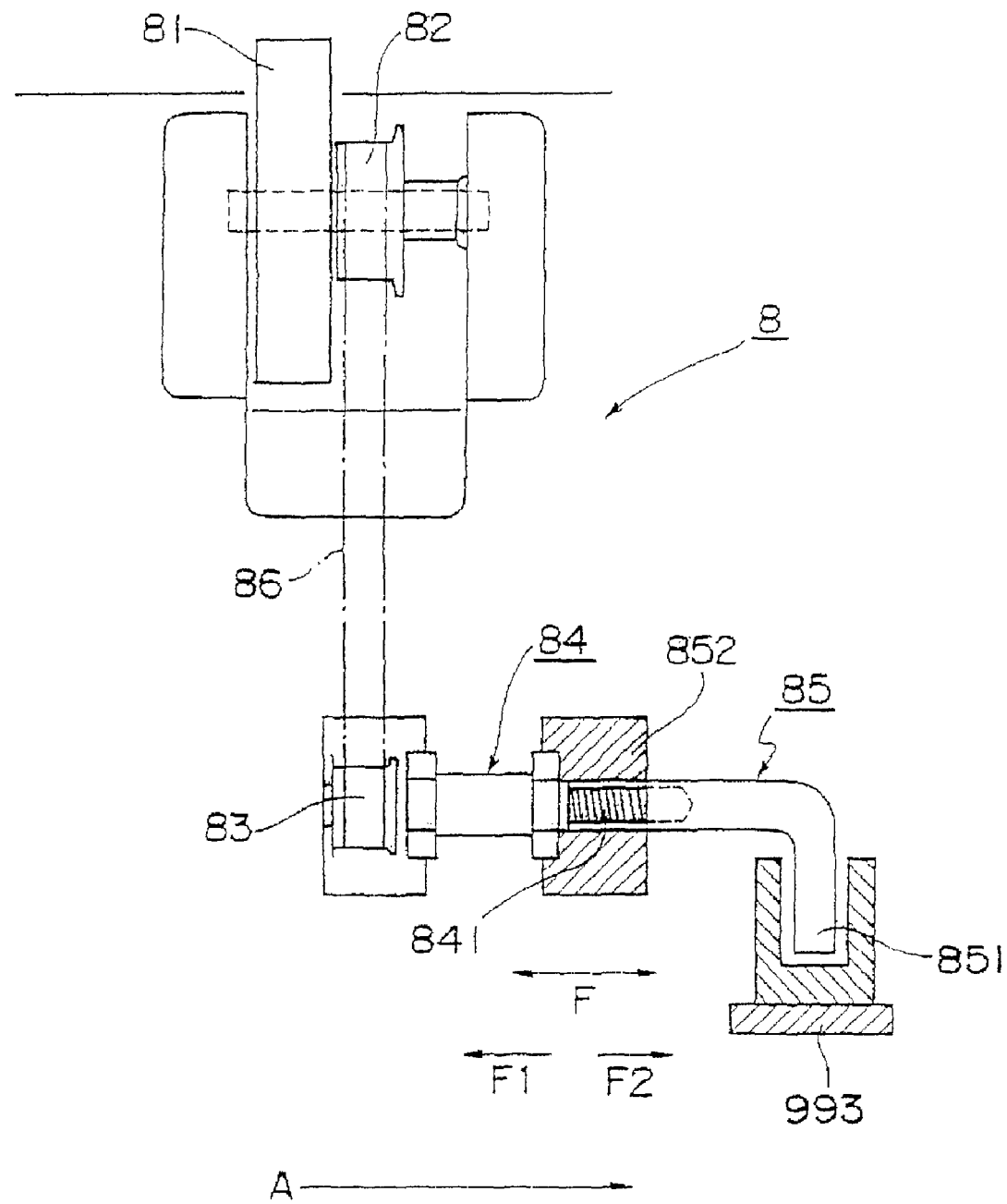
FIG. 36 is a fragmentary sectional view taken in the direction of arrow XXXVI of FIG. 35.
Figure 37:
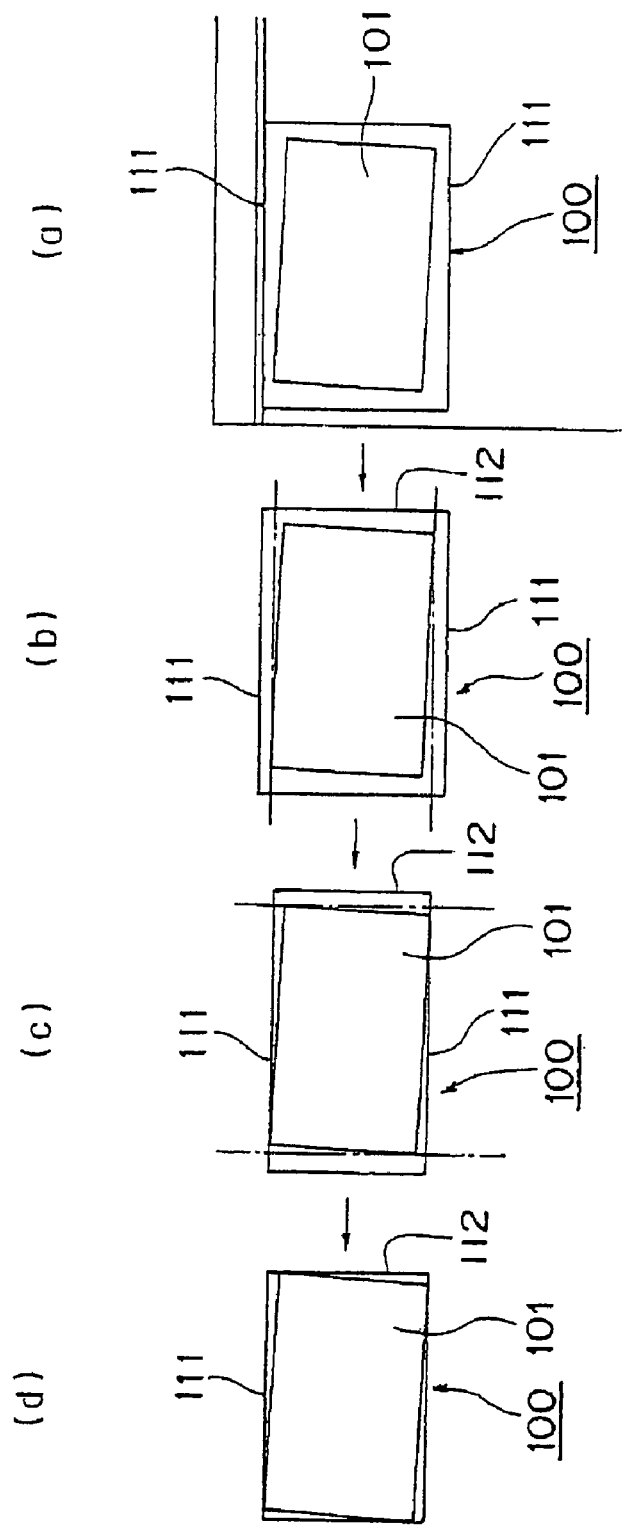
FIG. 37 is a schematic plan view showing a step of cutting a paper sheet in the conventional paper sheet processing device.

FIG. 36 is a fragmentary sectional view taken in the direction of arrow XXXVI of FIG. 35. The adjustment mechanism 8 comprises a dial 81, a pair of pulleys 82 and 83, a rotation rod 84 and an arm 85. The dial 81, the pair of pulleys 82 and 83 and the rotation rod 84 are secured to the paper feeding device part 15. The arm 85 is rotatably supported on the base frame 993 at one end 851 thereof. Furthermore, an endless belt 86 is stretched between the pulleys 82 and 83. The dial 81 is disposed so that it can be rotated manually. The pulleys 82 and 83 and the rotation rod 84 are configured to rotate in conjunction with the dial 81. The rotation rod 84 has a screw part 841 at its tip. The screw part 841 is screwed into a block 852 provided at the other end of the arm 85. Hence, the rotation rod 84 is configured to move back and forth with respect to the tip of the arm 85 in the direction of arrow F.

In the paper feeding device part 15 configured as described above, when the dial 81 of the adjustment mechanism 8 is rotated, the pair of pulleys 82 and 83 and the rotation rod 84 are rotated, whereby the rotation rod 84 moves with respect to the arm 85 in the direction of the arrow F. At this time, when the rotation rod 84 moves in the direction (the direction of arrow F1) away from the arm 85, for example, a force is applied from the base frame 993 to the paper feeding device part 15 via the arm 85 in the direction (the direction of the arrow F1 shown in FIG. 35) toward the upstream side of the carrying direction. However, since the paper feeding device part 15 is provided with the rotation shaft 56 and the arm 85 can rotate around one end 851 thereof, the force is exerted as a force for rotating the paper feeding device part 15 around the rotation shaft 56 in the direction of arrow G. Hence, in this case, the paper feeding device part 15 rotates in the direction of the arrow G. On the other hand, when the dial 81 is rotated in the direction opposed to that described above and when the rotation rod 84 is moved in the direction (the direction of arrow F2) of approaching the arm 85, the paper feeding device part 15 is rotated around the rotation shaft 56 in the direction of arrow H.

Hence, according to the paper feeding device part 15 configured as described above, the paper feeding device part 15 can be rotated around the rotation shaft 56 with respect to the device body 10 by rotating the dial 81. In other words, in the paper feeding device part 15 configured described above, the carrying direction (the direction of the arrow A) of the paper feeding device part 15 can be inclined with respect to the carrying direction (the direction of the arrow E) of the device body 10.

Furthermore, in the paper sheet processing device 1 provided with the paper feeding device part 15 configured as described above, as in the case of the fourth embodiment, by processing a paper sheet 100 having a printed area 101 inclined with respect to the fringe 111 thereof, it is possible to obtain a paper sheet 100 having the printed area 101 being in parallel with the fringe 111.

In this embodiment, the carrier means on the upstream side of the paper feeding device part 15 is not limited to the adsorption carrier means 50, but a roller feeding means and other known paper feeding means may also be used.

Moreover, the paper feeding device part 15 in accordance with this embodiment can be applied to the device body 10 of the paper sheet processing device 1 in accordance with the first to third embodiments.

INDUSTRIAL APPLICABILITY

The paper sheet processing device in accordance with the present invention can reduce time and effort required for replacement work for processing means, thereby being highly valuable in industrial application.

The invention claimed is:

1. A paper sheet processing device for processing paper sheets while carrying the paper sheets, comprising:
    a device body,
    carrier means for carrying the paper sheets one by one,
    carrier driving means for driving said carrier means,
    processing device parts, installed in a carrying route formed of said carrier means, for processing the paper sheets, and
    processing driving means for driving said processing device parts, wherein
    said processing device parts are installed detachably from said device body,
    at least one of said processing device parts is a processing device part for performing processing having a content selected as desired,
    said processing device part comprising:
        a plurality of individual processing units, each unit performing different kinds of processing,
        a unit accommodating part installed in the device body and detachably accommodating a processing unit that is selectable from among said plurality of processing units,
        the processing device part being configured to interlock a processing unit with the processing driving means when the unit accommodating part accommodates the processing unit,
        at least one of the plurality of processing units being a processing unit of carrier means for carrying the paper sheets,
        the device body being provided with processing unit detecting means for detecting the kind of processing of the processing units accommodated in the unit accommodating part of the processing device part.

2. The paper sheet processing device as claimed in claim 1, wherein
    said processing device part is an other processing device part for performing processing having a predetermined content to the paper sheets, and said other type processing device part has processing means for performing processing having the predetermined content to the paper sheets and moving means for moving said processing means to a desired position.

3. The paper sheet processing device as claimed in claim 2, wherein said processing means of said other type processing device part is cutting means for cutting the paper sheets in the carrying direction of the paper sheets, or perforation forming means for forming perforations in the paper sheets in the carrying direction of the paper sheets, or fold forming means for forming folds on the paper sheets in the carrying direction of the paper sheets.

4. The paper sheet processing device as claimed in claim 2, comprising position control means for reading position marks printed on the paper sheets and for controlling the position of said processing means on the basis of the information having been read.

5. The paper sheet processing device as claimed in claim 2, comprising processing control means for reading processing information printed on the paper sheets and for controlling the processing content of said processing means on the basis of the information having been read.

6. The paper sheet processing device as claimed in claim 1, wherein an other of the plurality of processing units is a processing unit of cutting means for cutting the paper sheets in a carrying direction of the paper sheets, or perforation forming means for forming perforations in the paper sheets in the carrying direction of the paper sheets, or fold forming means for forming folds on the paper sheets in the carrying direction of the paper sheets,
the processing unit having moving means for moving said cutting, perforation forms or fold forming means to a desired position.

7. The paper sheet processing device as claimed in claim 6, wherein said cutting means is configured such that multiple rotary blades are arranged at predetermined intervals in the width direction.

8. The paper sheet processing device as claimed in claim 7, wherein said cutting means comprising said multiple rotary blades is moved integrally.

9. The paper sheet processing device as claimed in claim 6, comprising position control means for reading position marks printed on the paper sheets and for controlling the position of said processing means on the basis of the information having been read.

10. The paper sheet processing device as claimed in claim 1, wherein an other of said plurality processing units is a processing unit of cutting means for cutting the paper sheets in a direction perpendicular to a carrying direction of the paper sheets, or fold forming means for forming folds on the paper sheets in the direction perpendicular to the carrying direction of the paper sheets.

11. The paper sheet processing device as claimed in claim 1, wherein at least one said processing device parts is cutting means for cutting the paper sheets in the carrying direction, and
wherein further comprising:
cutting waste elimination means for eliminating paper sheet cutting waste generated by cutting by said cutting means to the outside of the carrying route,
moving means for moving said cutting waste elimination means in the direction perpendicular to the carrying direction, and
movement control means for controlling said cutting waste elimination means to cutting waste generation positions.

12. The paper sheet processing device as claimed in claim 1, comprising a paper feeding device part for carrying and feeding the paper sheets one by one to said device body, said paper feeding device part comprising:
feeding means for feeding the paper sheets one by one, and
oblique carrier means, which is positioned on the downstream side of said feeding means and on which the paper sheet is placed, for obliquely carrying the paper sheet toward a guide wall so that the fringe of the paper sheet is aligned along a guide wall and for carrying the paper sheet to the downstream side of the carrying direction, wherein
said paper feeding device part is rotatable around a vertical shaft with respect to said device body so that the carrying direction in the paper feeding device part is inclined with respect to the carrying direction in said device body.

13. The paper sheet processing device as claimed in claim 1, comprising processing control means for reading processing information printed on the paper sheets and for controlling the processing content of said processing means on the basis of the information having been read.

\* \* \* \* \*